(12) United States Patent
Oishi et al.

(10) Patent No.: US 7,216,825 B2
(45) Date of Patent: May 15, 2007

(54) FISHING REEL

(75) Inventors: Harumichi Oishi, Tokyo (JP);
Mikiharu Kobayashi, Tokyo (JP);
Masashi Ono, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 11/393,841

(22) Filed: Mar. 31, 2006

(65) Prior Publication Data

US 2006/0180691 A1  Aug. 17, 2006

Related U.S. Application Data

(63) Continuation of application No. 10/653,249, filed on Sep. 3, 2003.

(30) Foreign Application Priority Data

Oct. 18, 2002 (JP) ............ P2002-303705
Oct. 24, 2002 (JP) ............ P2002-309489
Feb. 21, 2003 (JP) ............ P2003-044658

(51) Int. Cl.
*A01K 89/02* (2006.01)

(52) U.S. Cl. .............. 242/247; 242/257; 242/282

(58) Field of Classification Search .............. 242/249, 242/256, 257, 265, 295, 236, 282
See application file for complete search history.

(56) References Cited

U.S. PATENT DOCUMENTS

| | | |
|---|---|---|
| 873,784 A | 12/1907 | Reichardt |
| 2,428,908 A | 10/1947 | Cooper et al. |
| 2,591,338 A | 4/1952 | Cooper |
| 2,593,700 A | 4/1952 | Rosner |
| 3,446,453 A | 5/1969 | Pachner |
| 4,850,548 A | 7/1989 | Faulkner |
| 5,161,750 A | 11/1992 | Hitomi |
| 5,303,877 A | 4/1994 | Ciocca |
| 5,443,218 A | 8/1995 | Ciocca |

*Primary Examiner*—Emmanuel M Marcelo
(74) *Attorney, Agent, or Firm*—Sughrue Mion, PLLC

(57) ABSTRACT

A fishing reel includes: a reel body attachable to a fishing rod; a spool rotatably supported by the reel body; a handle disposed at a side portion of the reel body for rotating the spool to winding a fishing line on the spool; and an auxiliary operating member for auxiliary winding the fishing line on the spool provided at a position in which the auxiliary operating member can be operated by a finger of an angler's hand holding the fishing rod to which the reel body is attached.

7 Claims, 24 Drawing Sheets

FISHING REEL

This is a continuation of application Ser. No. 10/653,249 filed Sep. 3, 2003. The entire disclosure of the prior application, application Ser. No. 10/653,249 is considered part of the disclosure of the accompanying continuation application and is hereby incorporated by reference.

BACKGROUND OF THE INVENTION

The invention relates to a fishing reel of a type that a spool, on which a fishing line is to be wound, is rotatably supported between the two side plates of a reel main body and, in particular, to a fishing reel suitable for lure fishing.

Conventionally, as one of fishing methods, there is known lure fishing in which an artificial bait referred to as a lure is given actions to thereby catch fish; and, in the lure fishing, there is used a fishing reel having such a structure as shown in Japanese Patent No. 3009074 and Japanese Patent No. 3025172. In the lure fishing, normally, in the light of the fact that fish will not show an interest so much in an object moving steadily with a constant speed, the lure is given various actions; for example, it is stopped and moved by operating a rod or a reel.

As an example of operations to be executed in this case, there is know an operation in which a rod is pulled up after casting to give the lure some actions and the fishing line is taken up onto the spool by an amount corresponding to the pulled-up amount of the rod by operating and rotating a handle while holding down the rod in such a manner that the fishing line can be prevented from loosening. And, a fisherman repeats this series of lure actions (inducing operations for reeling up the fishing line) a required number of times according to the conditions of fishing spots and waits for a bite.

By the way, in carrying out the lure fishing using the above-structured fishing reel, the fisherman must carry out the lure action operations while using properly the rod operation by the fisherman's hand gripping and holding the reel and the reeling operation by the opposite hand. In other words, in a state where the arm for operating the rod after performing the casting operation is stretched full, or in a state where the handle faces downward (due to the relation thereof, the handle held together with the rod by the hand is easy to face downward), the other hand is situated at an unnatural position, which makes it hard to perform an easy and delicate handle rotation operation, that is, an easy and delicate reeling operation.

Further, when the fisherman holds an obstacle in the fishing spot or something with the handle-side hand, or when the fisherman supports the fishing rod with one hand and holds a landing net for taking fish therein with the other hand, both hands are used, which disables the fisherman to carry out the reeling operation with the handle-side hand.

SUMMARY OF THE INVENTION

The present invention aims at eliminating the drawbacks found in the conventional fishing reel. Accordingly, it is an object of the invention to provide a fishing reel which, in an actual fishing operation, makes it possible to carry out the lure actions with no trouble.

In order to solve the aforesaid object, the invention is characterized by having the following arrangement.

Aspect 1. A fishing reel comprising:
a reel body attachable to a fishing rod;
a spool rotatably supported by the reel body;
a handle disposed at a side portion of the reel body for rotating the spool to winding a fishing line on the spool; and
an auxiliary operating member for auxiliary winding the fishing line on the spool provided at a position in which the auxiliary operating member can be operated by a finger of an angler's hand holding the fishing rod to which the reel body is attached.

Aspect 2. The fishing reel according to the aspect 1, wherein the auxiliary operating member is rotatably provided between left and right side plates which constitute the reel body.

Aspect 3. The fishing reel according to the aspect 1, wherein the auxiliary operating member includes a lever portion to be operated by the finger.

Aspect 4. The fishing reel according to the aspect 3, wherein the lever portion projects downwardly from the reel body.

Aspect 5. The fishing reel according to the aspect 1, wherein the auxiliary operating member includes a dial-shaped portion to be operated by the finger.

Aspect 6. The fishing reel according to the aspect 5, wherein the dial-shaped portion is exposed from a lower surface of the reel body.

Aspect 7. The fishing reel according to the aspect 1, wherein the auxiliary operating member is urged in one direction by an urging member.

Aspect 8. The fishing reel according to the aspect 1, wherein the auxiliary operating member is formed so that, when the handle is rotated to rotate the spool, the auxiliary operating member is not rotated in response to the rotation of the handle.

Aspect 9. The fishing reel according to the aspect 8, wherein a one-way clutch is interposed between a rotating member rotated in response to the rotation of the handle and the auxiliary operating member.

Aspect 10. The fishing reel according to the aspect 9, wherein an operating portion of the auxiliary operating member to be operated by the finger is rotatably provided between left and right side plates which constitute the reel body.

Aspect 11. The fishing reel according to the aspect 9, wherein the operating portion is formed in a lever shape.

Aspect 12. The fishing reel according to the aspect 10, wherein
the reel body is provided with a finger rest plate extending between the side plates and
the operating portion projects upwardly from a surface of the finger rest so that when a thumb of the angler's hand is put on the finger rest plate, the operating portion can be operated by the thumb.

Aspect 13. The fishing reel according to the aspect 12, wherein the auxiliary operating member extends along a rear edge of the finger rest plate, and the operating portion inclines backwardly.

DETAILED DESCRIPTION OF PREFERRED EMBODIMENTS

Now, description will be given below in detail of the preferred embodiments of a fishing reel according to the invention with reference to the accompanying drawings.

First Embodiment

Figure 1:
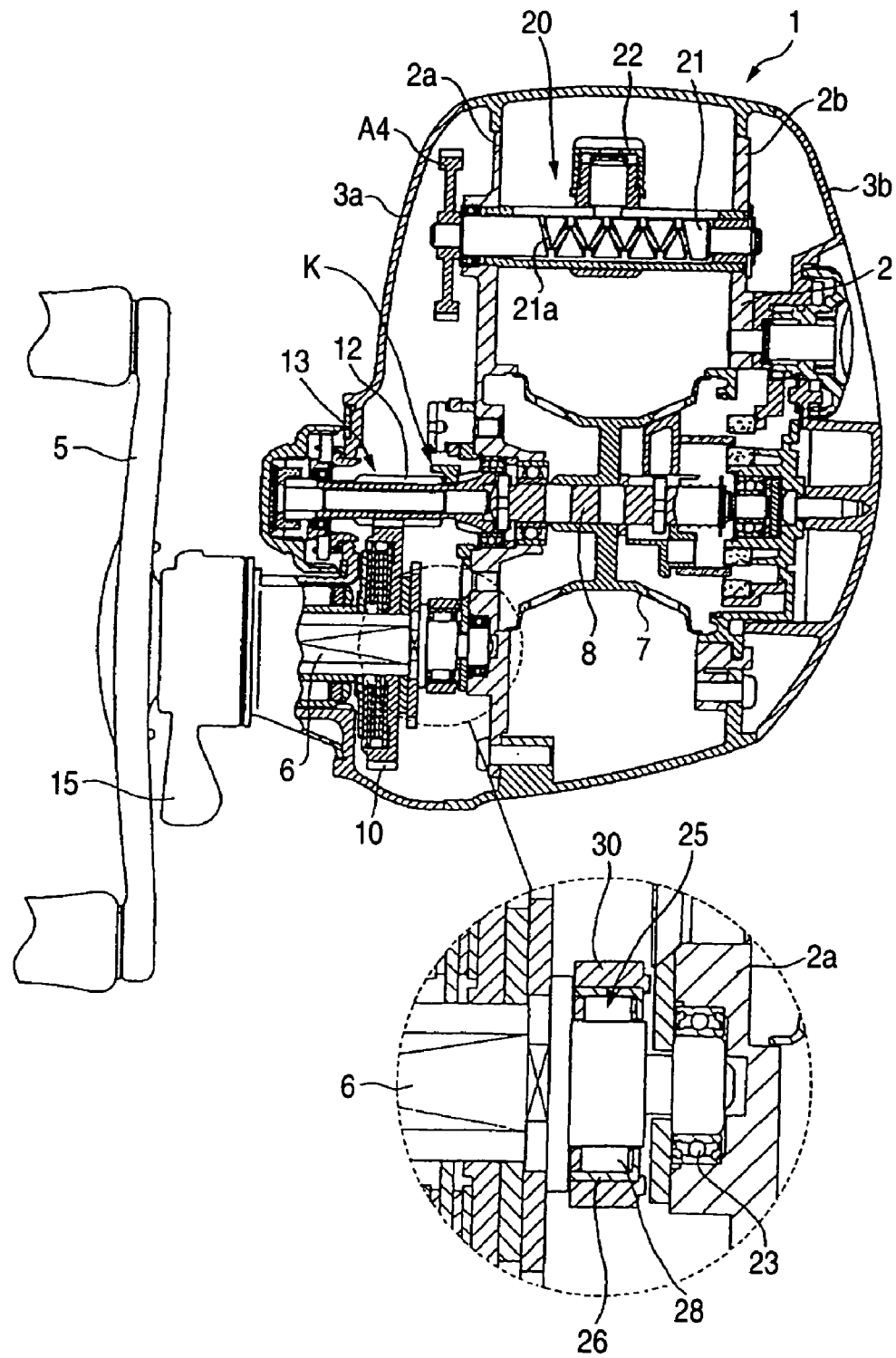
FIG. 1 is a sectional plan view of a first embodiment of a fishing reel according to the invention and an enlarged section view of the main portions thereof.
Figure 2:
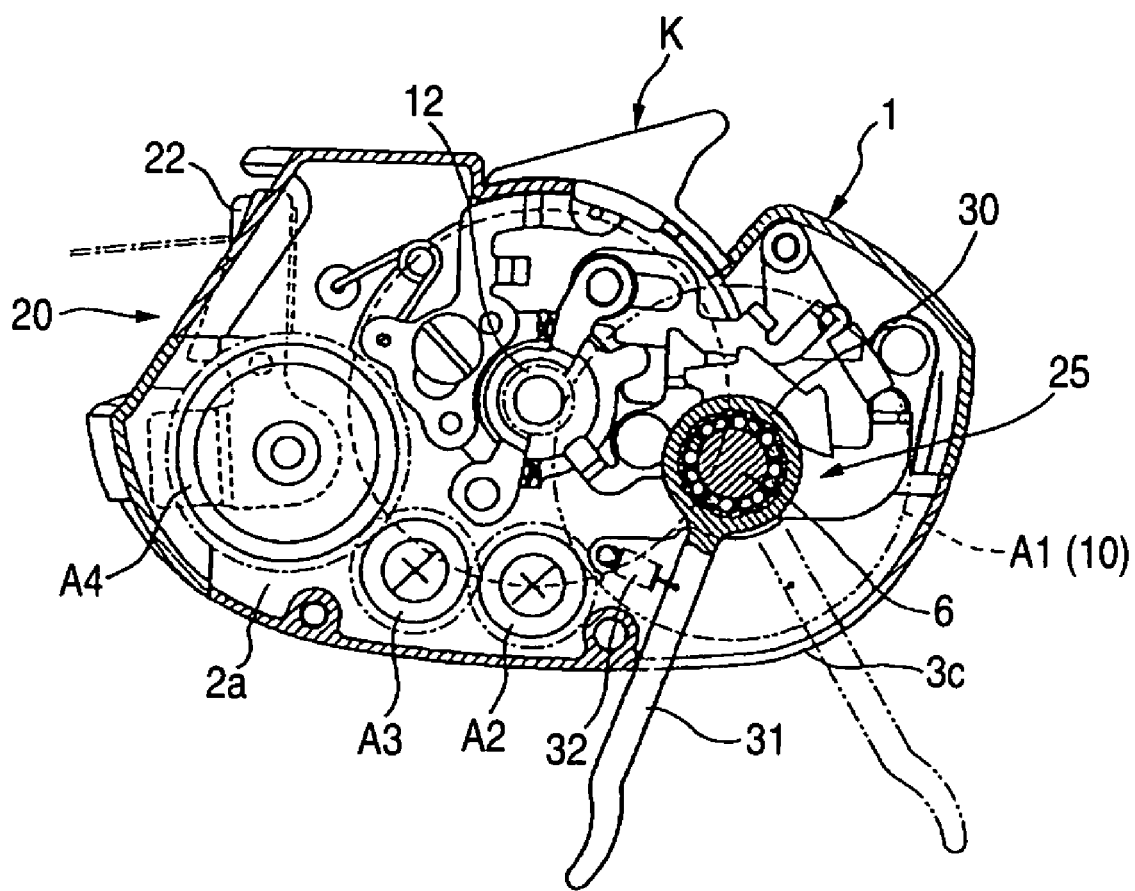
FIG. 2 a side view of the fishing reel shown in FIG. 1 with two side plates removed therefrom, when it is viewed from the handle side thereof.
Figure 3:
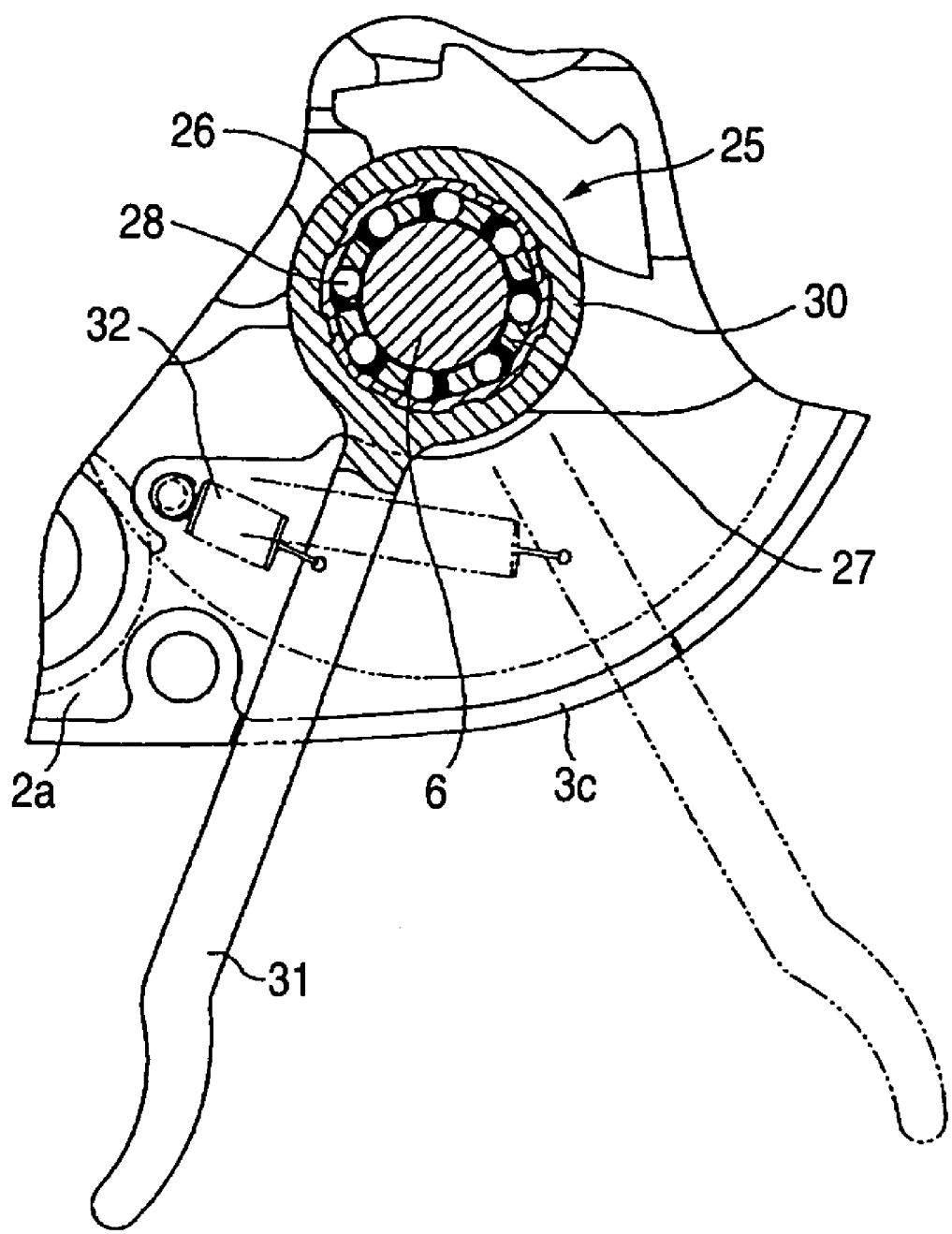
FIG. 3 is an enlarged view of a portion of an auxiliary operation member used in the first embodiment.
Figure 4:
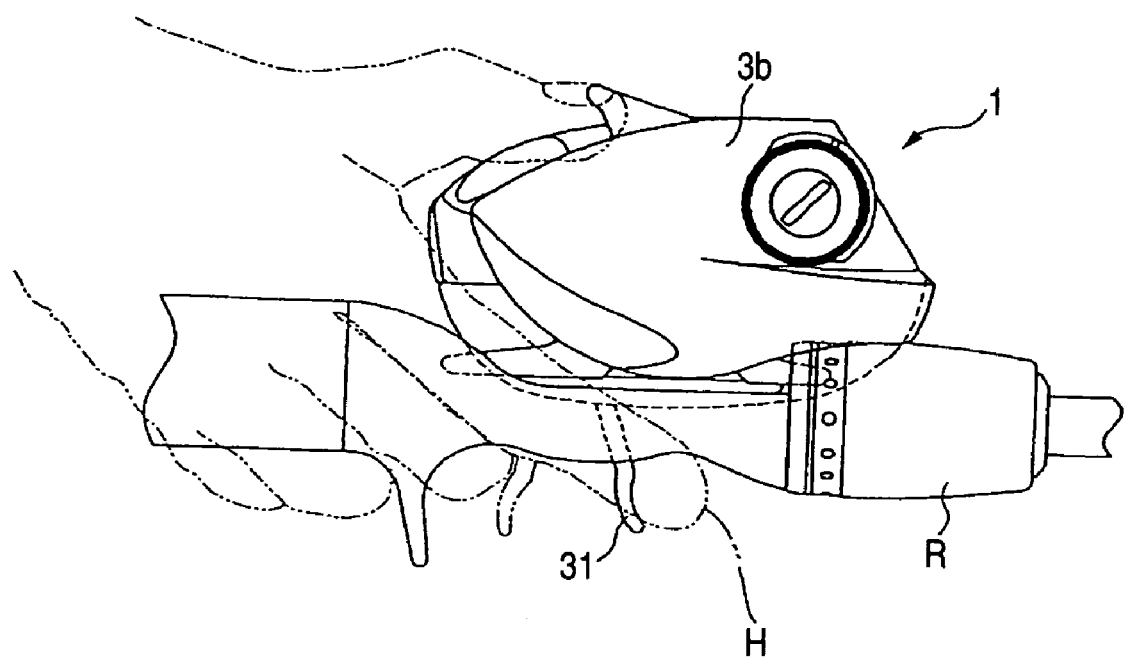
FIG. 4 is an explanatory view to show how the fishing reel shown in FIG. 1 is operated.

FIGS. 1 to 4 show a first embodiment of a fishing reel according to the invention. Specifically, FIG. 1 is a sectional plan view of the fishing reel and an enlarged view of the main portions thereof, FIG. 2 is a sectional side view of the fishing reel, when it is viewed from the handle side thereof with the side plate thereof removed therefrom, FIG. 3 is an enlarged sectional view of the auxiliary operation member portion thereof, and FIG. 4 is a view to show how the fishing reel is operated.

The reel main body 1 of a fishing reel according to the present embodiment includes left and right side plates 3a, 3b which are mounted to the left and right frames 2a, 2b of a frame 2 with given spaces between them; and, on one side plate side (in the present embodiment, the left side plate 3a), there is rotatably supported a handle shaft 6 with a handle 5 mounted thereon.

Between the left and right side plates 3a, 3b is rotatably supported a spool shaft 8 with a spool 7 mounted thereon around which a fishing line is to be wound. The spool 7 can be driven and rotated by operating and rotating the handle 5 through a drive gear 10 mounted on the handle shaft 6 and a reeling drive mechanism 13 including a pinion 12 which is mounted on the spool shaft 8.

On the handle shaft 6 is disposed a rotary body 15 (a drag adjust body) which is used to operate a known drag mechanism for adjusting a brake force to be applied to the spool 7; and, through the rotational operation of the rotary body 15, a desired brake force can be applied to the rotation of the spool 7 in the fishing line play-out operation.

Between the portions of the left and right side plates 3a, 3b that are present in front of the spool 7 of the reel main body 1 is rotatably supported a drive shaft 21 constituting a level wind device 20 which can be rotated in linking with the reeling drive mechanism 13 through gear transmission mechanisms A1–A4 and can be reciprocated right and left so as to wind the fishing line on the spool 7 in parallel. In the outer periphery of the drive shaft 21 is formed a spiral groove 21a with which a fishing line guide body 22 can be engaged in a rotation preventive manner; and, when the drive shaft 21 is driven and rotated, the fishing line guide body 22 can be reciprocated right and left to thereby be able to wind the fishing line on the spool 7 uniformly.

The one-end portion of the handle shaft 6 is rotatably supported on the left frame 2a through a bearing 23, while on the handle shaft 6 is mounted an auxiliary operation member 30 through a one-way clutch 30 which is disposed so as to adjoin the bearing 23. The auxiliary operation member 30 includes a lever-shaped operation portion 31 which projects downwardly from the reel main body through an opening 3c formed in the lower surface of the left side plate 3a. The operation portion 31 is normally rotationally urged in the forward direction by an urging spring 32 which is disposed in the interior of the reel main body.

The one-way clutch 25 includes an outer race 26 to be fitted with the auxiliary operation member 30 and a plurality of rollers 28 respectively held in a retainer 27. In a state where the operation portion 31 of the auxiliary operation member 30 is urged forwardly by the urging force of the urging spring 32, when the handle shaft 6 is driven for reeling operation (in FIG. 3, when it is rotated counterclockwise), the rollers 28 are situated in the free rotation area of the outer race 26 and the rotational drive forces of the rollers 28 are not transmitted to the auxiliary operation member 30; and, when the operation portion 31 of the auxiliary operation member 30 is moved (pulled backwardly) against the urging force of the urging spring 32, the rollers 28 are situated in the wedge area of the outer race 26 and thus the rotational movement of the operation portion 31 can be transmitted to the handle shaft 6 through the one-way clutch 25.

Due to provision of the above-structured auxiliary operation member 30, by using the finger H (forefinger, middle finger, or ring finger) of the hand holding a rod R and counter-handle-side side plate 3b of the reel main body, the lever-shaped operation portion 31 can be operated and pulled against the urging force of the urging spring 32. Accordingly, when carrying out the lure actions after a known clutch mechanism K is switched over to a spool free state and a casting operation is executed, the rotational movement of the operation portion 31 can be transmitted to the handle shaft 5 through the one-way clutch 25 by pulling the operation portion 31 in the above manner. As a result of this, the clutch mechanism is switched from the spool free state over to the reeling state and, at the same time, the delicate reeling operation (reeling auxiliary operation) can be executed continuously. That is, regardless of the expanded or contracted state of the arm for operating the rod R and the state of the wrist of the present arm, through an operation to be executed by the fingers of the hand gripping and holding the reel main body 1, the delicate fishing line take-up operation can be carried out quickly and easily while maintaining the stable holding state of the fishing rod. Especially, since the operation portion for executing the winding operation is formed in a lever-like shape, the fingers of the hand holding the fishing rod can be made to fit the operation portion gently, which can facilitate the pulling operation of the operation portion.

Further, because the auxiliary operation member 30 is mounted on a rotary shaft for driving the spool 7 through the one-way clutch 25, when winding the fishing line on the spool 7 through the reeling operation of the handle 5, the auxiliary operation member 30 is not linked with the fishing line winding operation, which can enhance the operation efficiency of the fishing reel as a whole.

The auxiliary operation member for driving and winding the spool 7 auxiliarily can be disposed at various positions of the reel main body, provided that the positions allow the auxiliary operation member to be operated by the fingers of the hand on the counter-handle side. Now, description will be given below of an embodiment of a fishing reel having the above-mentioned structure.

By the way, in the following embodiments, composing parts thereof having the same structures as in the above-mentioned embodiment are given the same designations and thus the description thereof is omitted or simplified.

Second Embodiment

Figure 5:
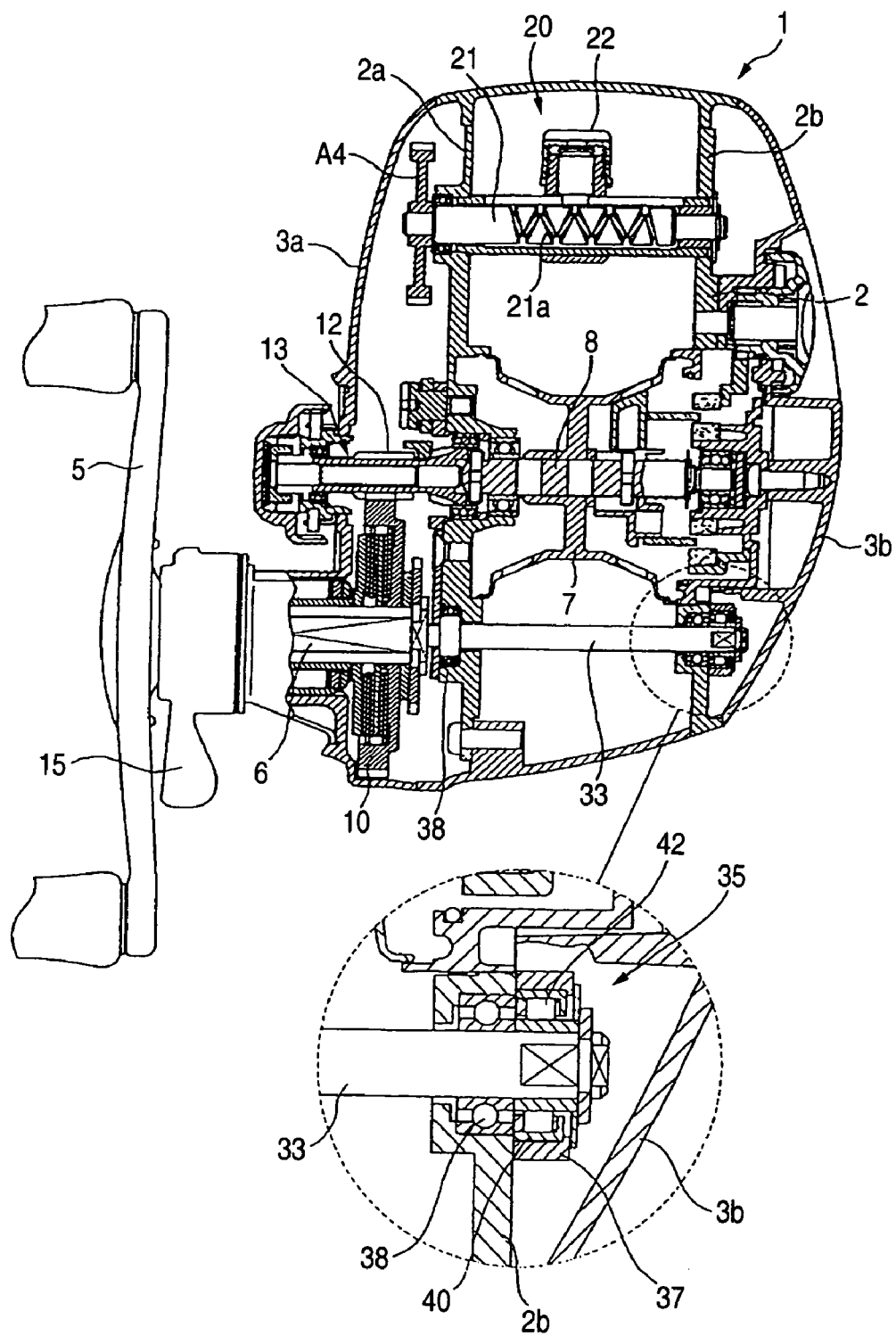
FIG. 5 is a sectional plan view of a second embodiment of a fishing reel according to the invention and an enlarged section view of the main portions thereof.
Figure 6:
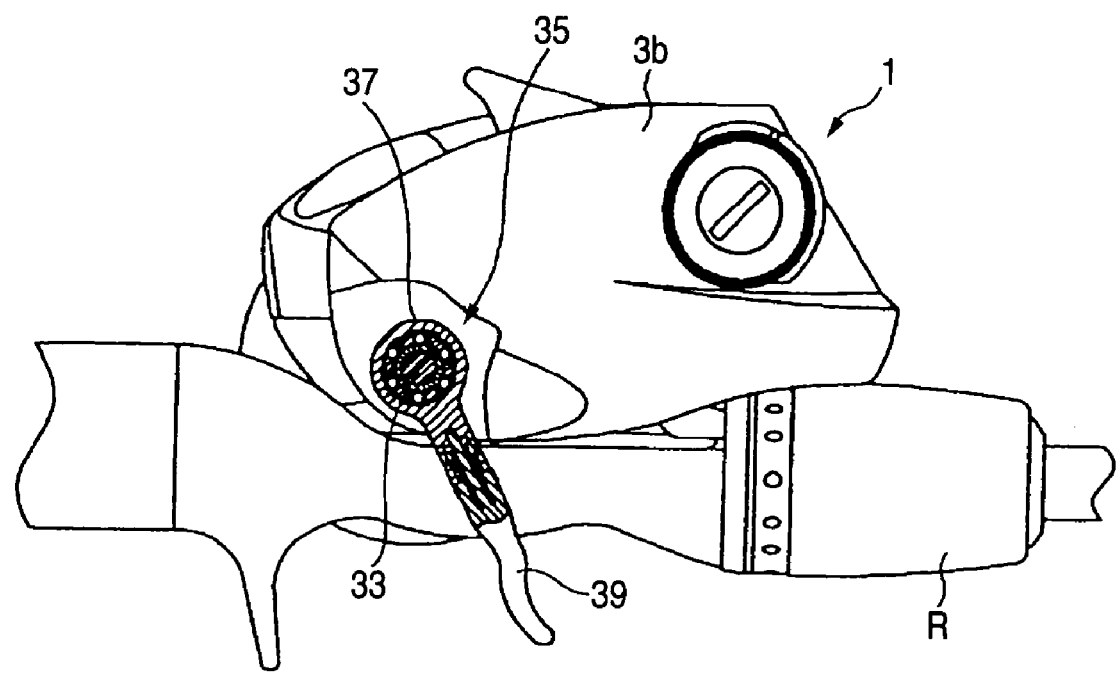
FIG. 6 a side view of the fishing reel shown in FIG. 5, when it is viewed from the counter-handle side thereof.
Figure 7:
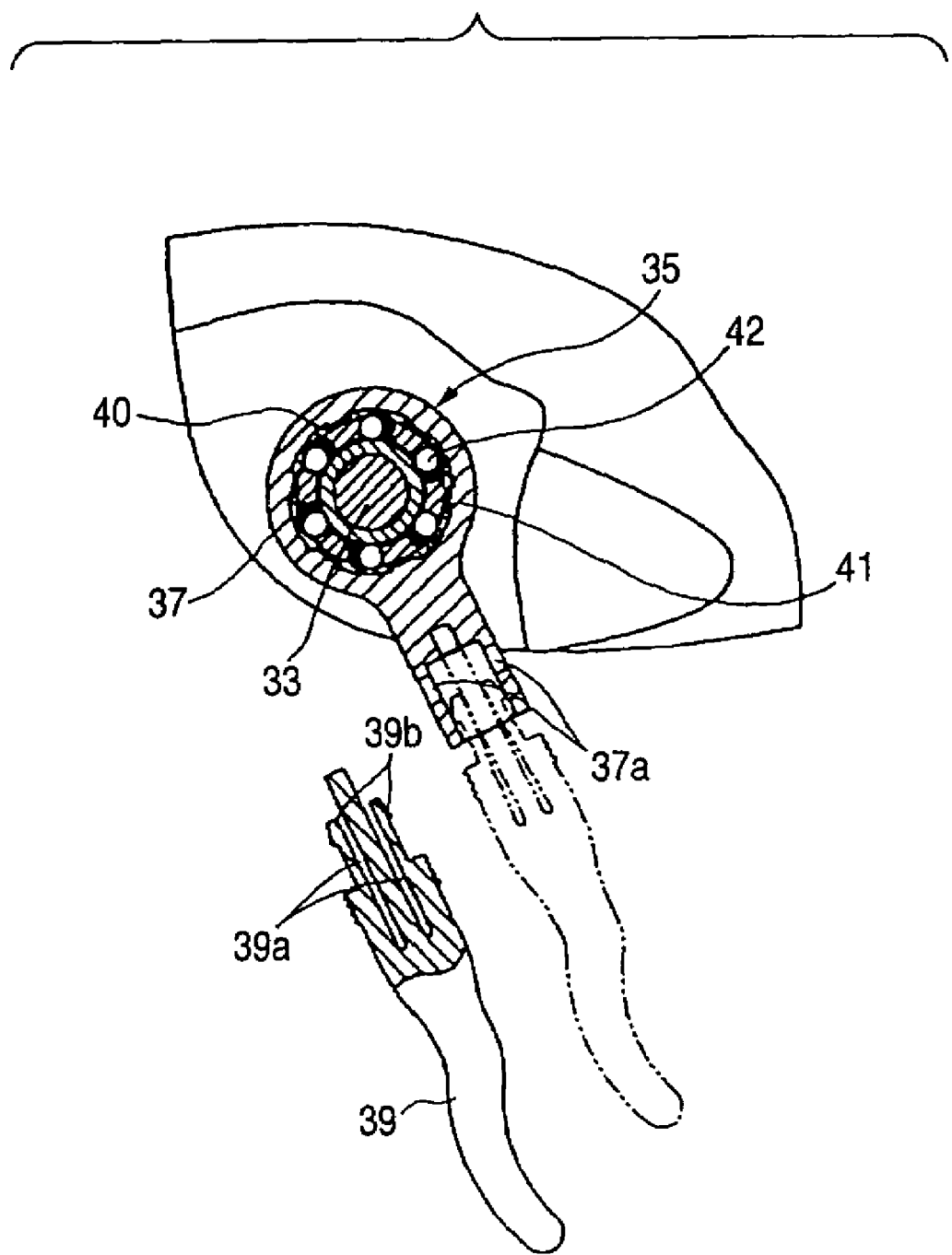
FIG. 7 is an enlarged view of a portion of an auxiliary operation member used in the second embodiment.

FIGS. 5 to 7 show a second embodiment of a fishing reel according to the invention. Specifically, FIG. 5 is a sectional plan view of a fishing reel according to the second embodiment and an enlarged view of the main portions thereof, FIG. 6 is a sectional view of the fishing reel, when it is viewed from the counter-handle side thereof, and FIG. 7 is an enlarged section view of the structure of an auxiliary operation member employed in the present embodiment.

In the present embodiment, on a handle shaft 6 which is disposed on the rear side of a left side plate 3a, there is formed an extension portion 33 which can be rotated on the handle shaft 6 integrally with the handle shaft 6. The leading end of the extension portion 33 is projected from a right frame 2b. On the projecting end of the extension portion 33, similarly to the previous embodiment, there is supported an auxiliary operation member 37 including a lever-shaped operation portion 39 through a one-way clutch 35. The extension portion 33 is rotatably supported on the two side frames 2a, 2b through bearings 38, while the operation portion 39 of the auxiliary operation member 37 is projected externally through an opening formed in the rear of the lower surface of a counter-handle-side side plate 3b. The operation portion 39 is formed so as to have such size and position that allow itself to be operated and rotated using the finger (mainly, the middle finger or ring finger) of the hand that grips and holds the counter-handle-side side plate 3b.

The operation portion 39 of the auxiliary operation member 37 according to the present embodiment is structured such that, as shown in FIG. 7, it can be mounted onto and removed from the main body of the auxiliary operation member 37. Specifically, in the operation portion 39, there is formed elastic securing portions 39b which can be elastically deformed by grooves 39a formed so as to extend in the axial direction of the insertion portion 39; and thus, by pinching the base end side of the operation portion 39, the operation portion 39 can be removed from the securing portion 37a of the main body of the auxiliary operation member 37. The operation portion 39 is normally urged in the forward direction by an urging spring (not shown) which is disposed in the interior of the reel main body.

The one-way clutch 35 is structured in the following manner. That is, it includes an outer race 40 to be fitted with the auxiliary operation member 37 and a plurality of rollers 42 respectively held by a retainer 41. Similarly to the previous embodiment, in a state where the operation portion 39 of the auxiliary operation member 37 is urged forwardly by the urging force of the urging spring, even when the extension portion 33 is driven and rotated together with the winding and driving operation of the handle shaft 6 (in FIG. 7, it is rotated clockwise), the rotational drive force of the extension portion 33 is not transmitted to the auxiliary operation member 37; and, when the operation portion 39 is operated and moved (it is operated and pulled backwardly) against the urging force of the urging spring, the rotational movement of the operation portion 33 can be transmitted to the handle shaft 6 through the extension portion 33.

As described above, the auxiliary operation member can be disposed not only on the handle-side side plate but also in a proper portion of the counter-handle-side side plate 3b and, in this structure as well, there can be obtained similar operation effects to the previously described first embodiment. By the way, because of the fact that the operation portion 39 can be removably mounted on the main body of the auxiliary operation member 37, even in a fishing method which does not require the auxiliary winding operation of the spool 7, the present embodiment can be used with no trouble.

Third Embodiment

Figure 8:
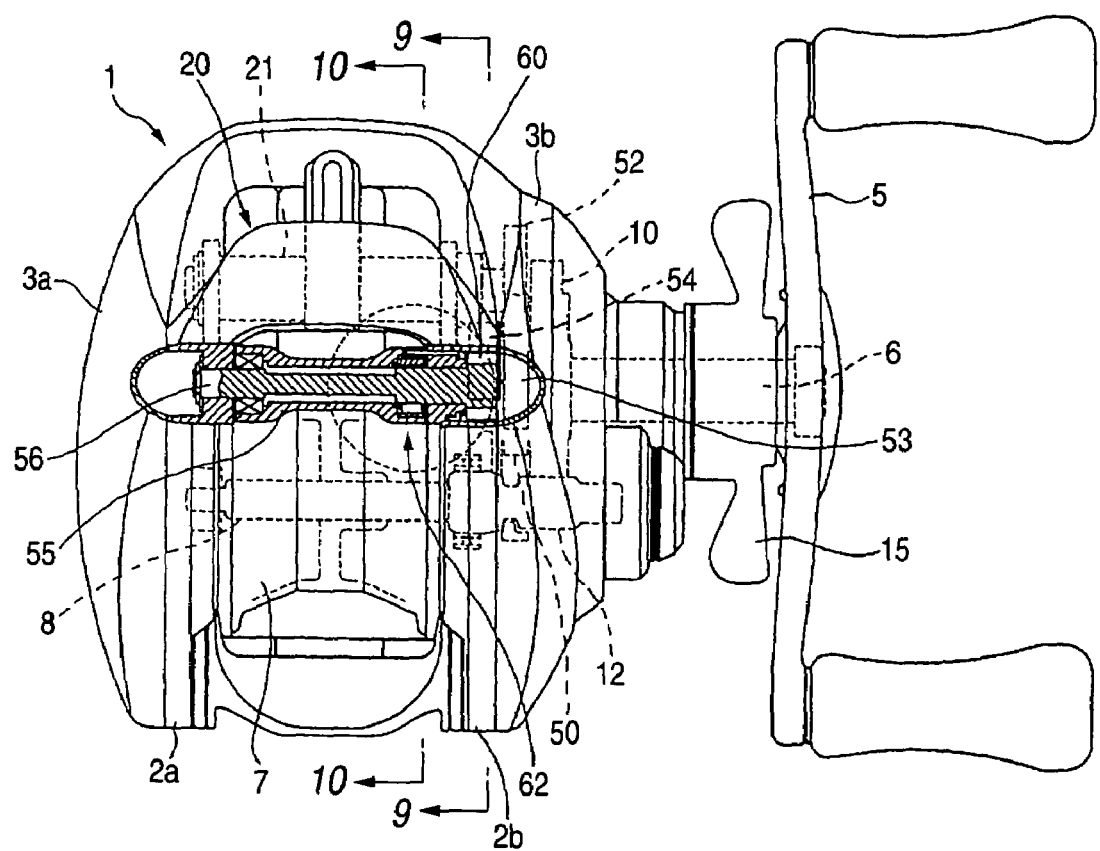
FIG. 8 is a plan view of a third embodiment of a fishing reel according to the invention.
Figure 9:
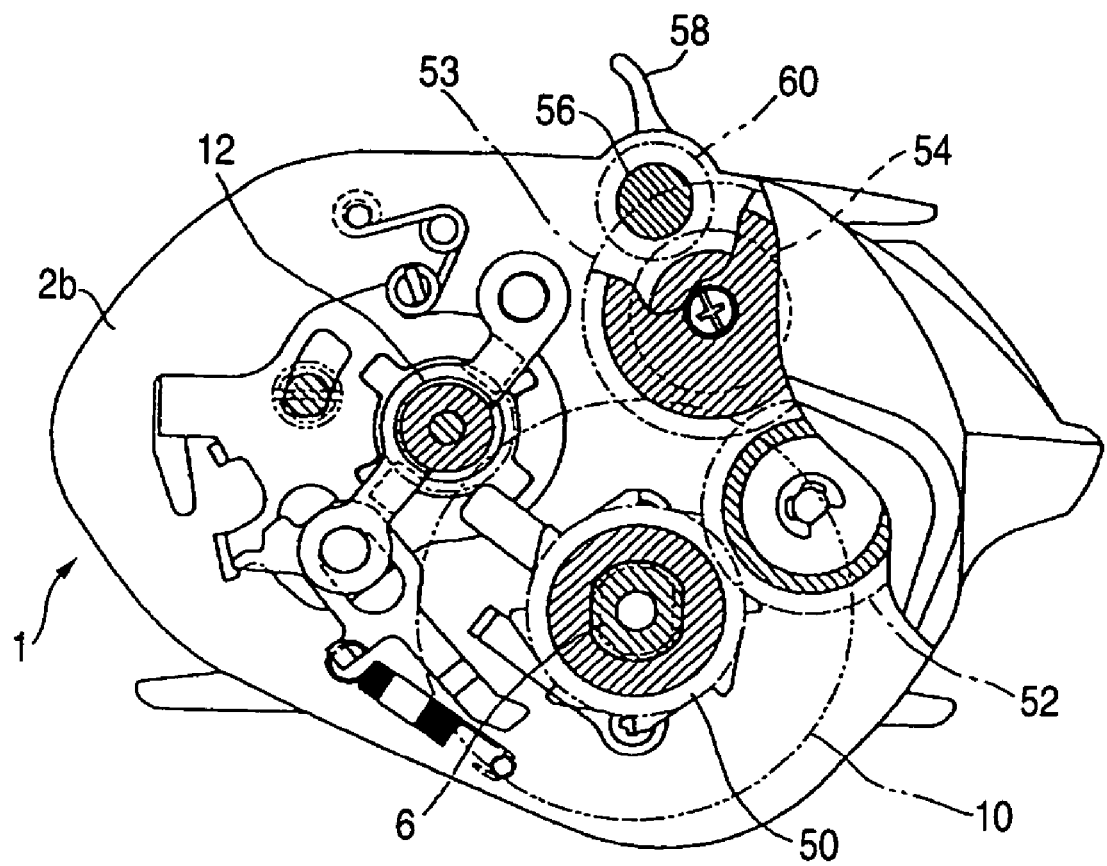
FIG. 9 is a section view taken along the line 9—9 shown in FIG. 8.
Figure 10:
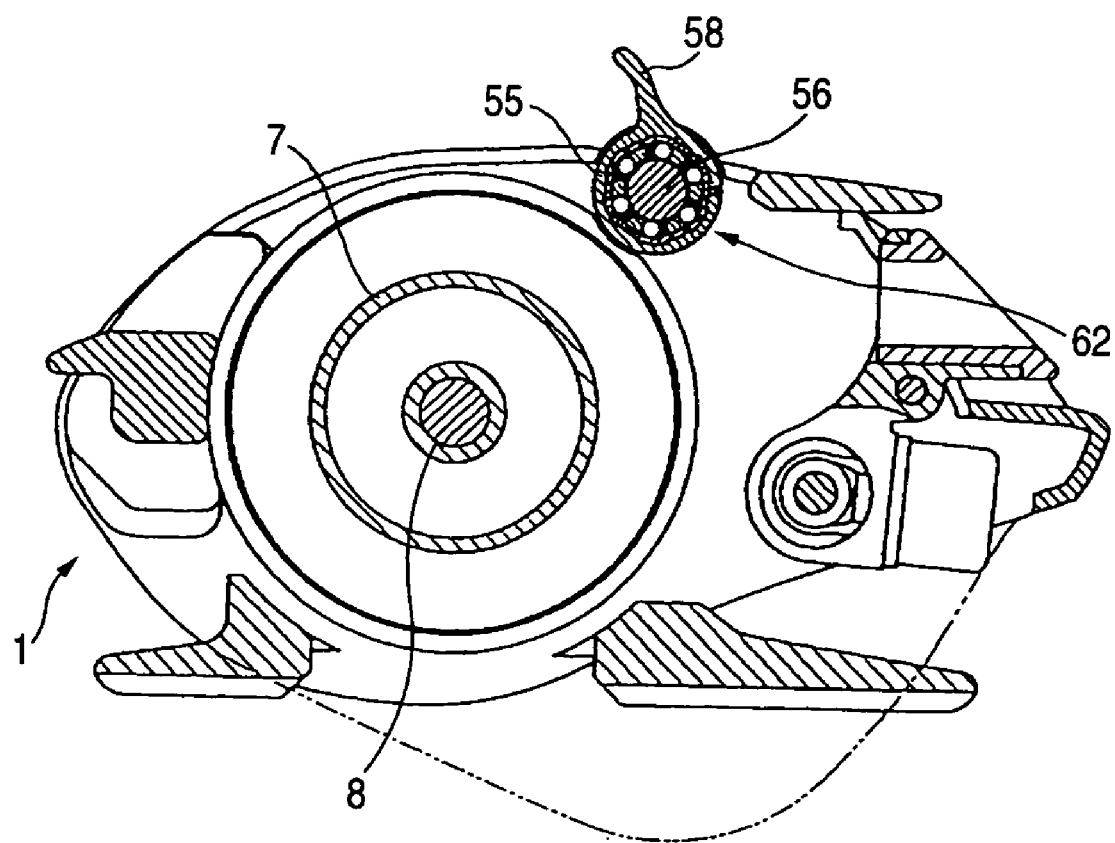
FIG. 10 is a section view taken along the line 10—10 shown in FIG. 8.
Figure 11:
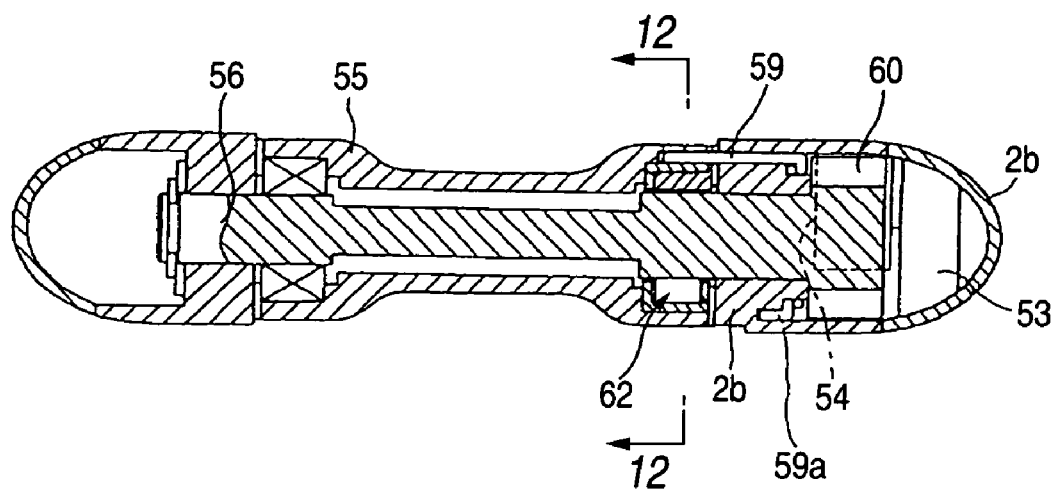
FIG. 11 is a sectional plan view of the structure of an auxiliary operation member used in the third embodiment.
Figure 12:
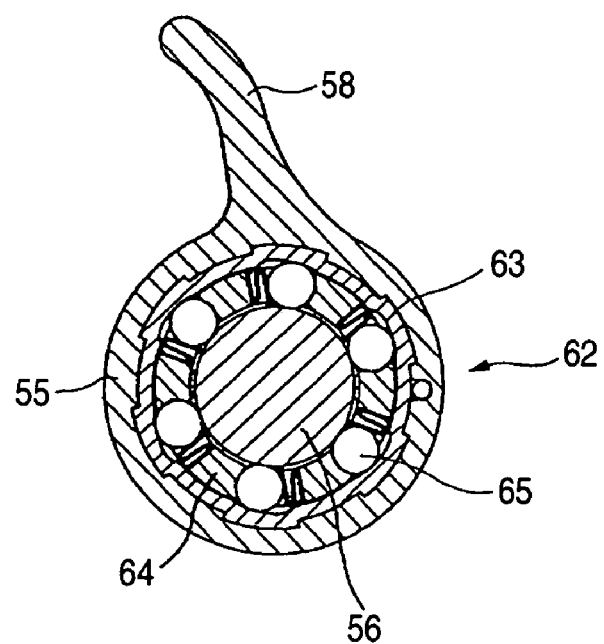
FIG. 12 is a section view taken along the line 12—12 shown in FIG. 11.

Now, FIGS. 8 to 12 show a third embodiment of a fishing reel according to the invention. Specifically, FIG. 8 is a sectional plan view of the fishing reel according to the third embodiment, FIG. 9 is a section view taken along the line 9—9 shown in FIG. 8, FIG. 10 is a section view taken along the line 10—10 shown in FIG. 8, FIG. 11 is a sectional plan view of the structure of an auxiliary operation member employed in the present embodiment, and FIG. 12 is a section view taken along the line 12—12 shown in FIG. 11.

In a fishing reel 1 according to the present embodiment, a handle shaft 6 with a handle 5 mounted thereon is rotatably supported on the right side plate 3b side. The handle shaft 6 includes a gear 50 formed so as to adjoin a drive gear 10, while the gear 50 is meshed with a gear 52 mounted on the end portion of a drive shaft 21 which constitutes a level wind device 20. The drive gear 52 is meshed with, of gears 53, 54 which are respectively supported on a right frame 2b in such a manner that they can be rotated integrally with the right frame 2b, the gear 53 situated on the handle side.

Between the left and right side plates 3a, 3b is interposed an auxiliary operation member 55 at a position above the spool 7 in such a manner that it can be rotated and a plate 24 that partially forms an upper surface of the reel body 1. The auxiliary operation member 55 is disposed on a rotary shaft 56 so as to enclose the rotary shaft 56, while the rotary shaft 56 is rotatably supported between the left and right frames 2a, 2b. As shown in FIGS. 9 and 10, the auxiliary operation member 55 includes a lever-shaped operation portion 58 which extends widely between the left and right frames 3a, 3b and can be operated in such a manner that it can be fallen backwardly by a finger. By the way, the operation portion 58 is normally urged in the direction, where it is rotated forwardly, by an urging spring 59 having one end 59a mounted on the right frame 2b. The rotary shaft 56 is provided on the right frame 2b and is projected toward the handle side and. On the projecting end of the rotary shaft 56 is mounted a gear 60 which can be meshed with the gear 54.

Between the auxiliary operation member 55 and rotary shaft 56 is interposed a one-way clutch 62. The one-way clutch 62 includes an outer race 63 to be fitted with the auxiliary operation member 55 and a plurality of rollers 65 respectively held by a retainer 64. Similarly to the previously described embodiment, in a state where the operation portion 58 of the auxiliary operation member 55 is urged forwardly by the urging force of the urging spring 59, even when the handle 6 is driven and rotated (in FIG. 9, it is rotated clockwise), the rotational drive force of the handle 6 is not transmitted to the auxiliary operation member 55. In case where the operation portion 58 is operated and moved (it is fallen backwardly) against the urging force of the urging spring 59, the rotational movement of the operation portion 58 can be transmitted to the handle 6 through the above-mentioned gears 60, 54, 53, 52, 50.

In the present structure as well, there can be obtained similar operation effects to the previously described embodiments. Since the auxiliary operation member 55 is interposed between the two side plates of the reel main body, the projecting portions of the reel main body can be reduced and a dead space between the two side plates can be effectively used to thereby be able to dispose the auxiliary operation member. Further, when gripping the reel main body as to enclose the body, the auxiliary operation member 55 can be interposed horizontally between the two side plates, position of which are easy to operate by the finger; and, therefore, after execution of the casting operation, the spool delicate winding operation can be carried out in a stable manner. That is, the winding auxiliary operation can be executed easily using the fingers of the right or left hand holding the reel main body.

Fourth Embodiment

Figure 13:
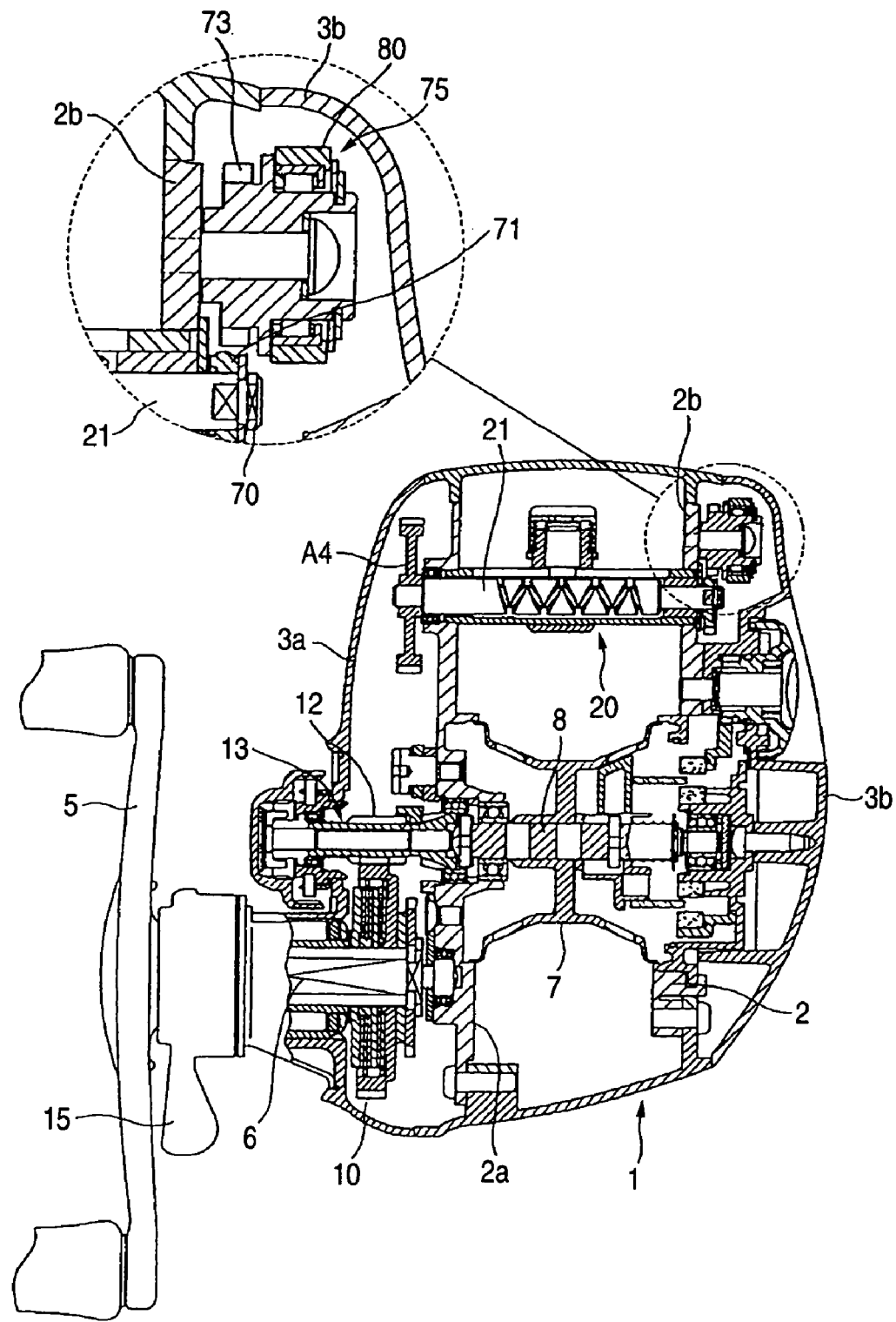
FIG. 13 is a sectional plan view of a fourth embodiment of a fishing reel according to the invention and an enlarged section view of the main portions thereof.
Figure 14:
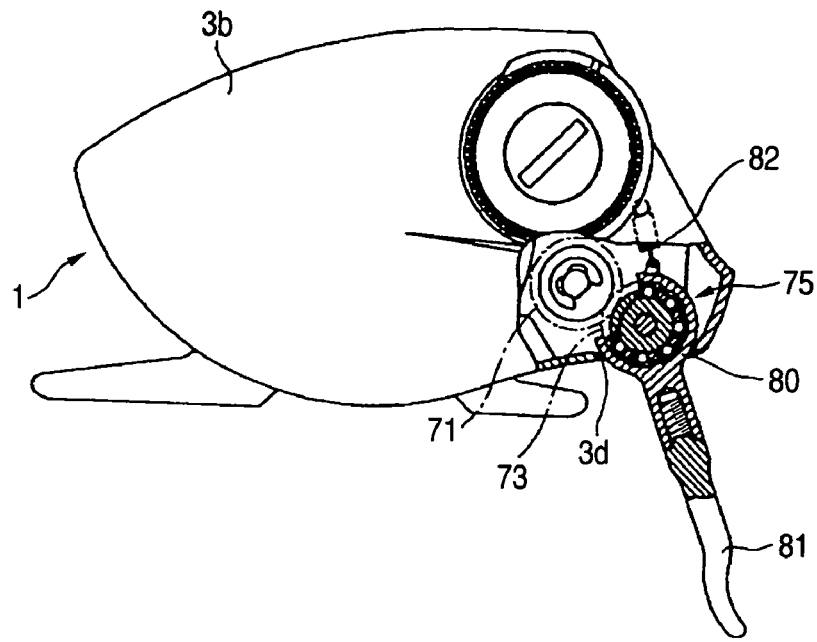
FIG. 14 a side view of the fishing reel shown in FIG. 13, when it is viewed from the counter-handle side thereof.
Figure 15:
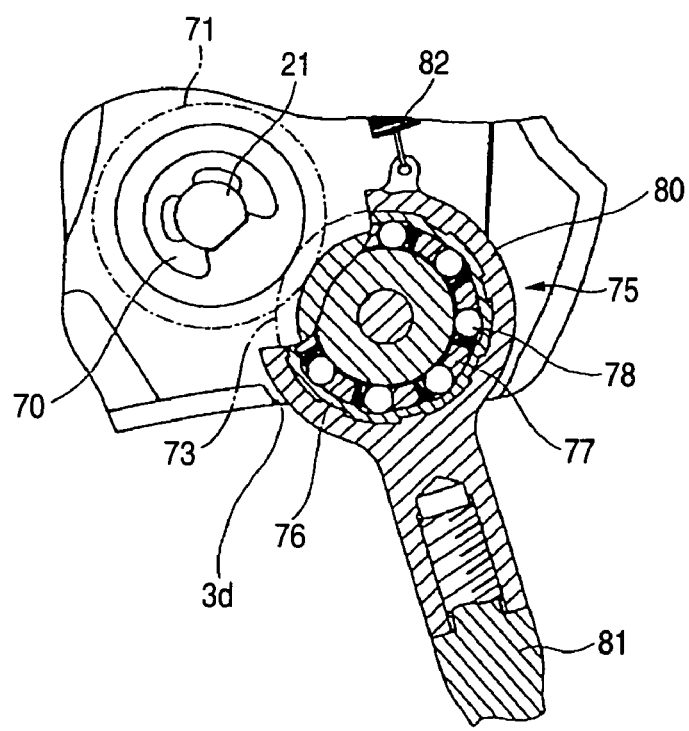
FIG. 15 is an enlarged section view of a portion of an auxiliary operation member used in the fourth embodiment.

Now, FIGS. 13 to 15 respectively show a fourth embodiment of a fishing reel according to the invention. Specifically, FIG. 13 is a sectional plan view of a fishing reel according to the fourth embodiment of the invention and an enlarged section view of the main portions thereof, FIG. 14 is a partial section view of the present fishing reel when it is viewed from the counter-handle side thereof, and FIG. 15 is an enlarged section view of an auxiliary operation member.

In the fishing reel according to the present embodiment, on the portion that projects from the right frame 2b of a drive shaft 21 constituting a level wind device 20 is mounted a gear 71 through a removal preventive retaining ring 70. With the gear 71 is meshed a gear 73 which is rotatably supported on the right frame 2b; and, on the gear 73 is rotatably mounted an auxiliary operation member 80 through a one-way clutch 75.

The auxiliary operation member 80 includes a lever-shaped operation portion 81 which projects downwardly of the reel main body through an opening 3d formed in the lower surface of the right side plate 3b, and the operation portion 81 is normally urged in the direction, where the operation portion 81 can be rotated forwardly, by an urging spring 82 disposed within the reel main body. The one-way clutch 75 includes an outer race 76 to be fitted with the auxiliary operation member 80 and a plurality of rollers 78 respectively held by a retainer 77. In a state where the operation portion 81 of the auxiliary operation member 80 is rotationally urged forwardly by the urging force of an urging spring 82, even in case where the handle shaft 6 is windingly driven, the rotational drive force of the handle shaft 6 is not transmitted to the auxiliary operation member 80. On the other hand, in case where the operation portion 81 of the auxiliary operation member 80 is operated and moved (that is, it is operated and pulled backwardly) against the urging force of the urging spring 82, the rotational movement of the operation portions 81 can be transmitted to the handle shaft 6 through the gears 73, 71 and also through the previously described gear transmission mechanisms A4–A1 (see FIG. 2).

In the structured fishing reel as well, there can be obtained similar operation effects to the previously described embodiments. The operation portion 81 can be threadedly fitted to the main body of the auxiliary operation member 80 in such a manner that it can be mounted onto and removed from the auxiliary operation member 80. By virtue to this, even in a fishing method which does not require the auxiliary winding operation of the spool 7, the present fishing reel can be used with no difficulty.

Fifth Embodiment

Figure 16:
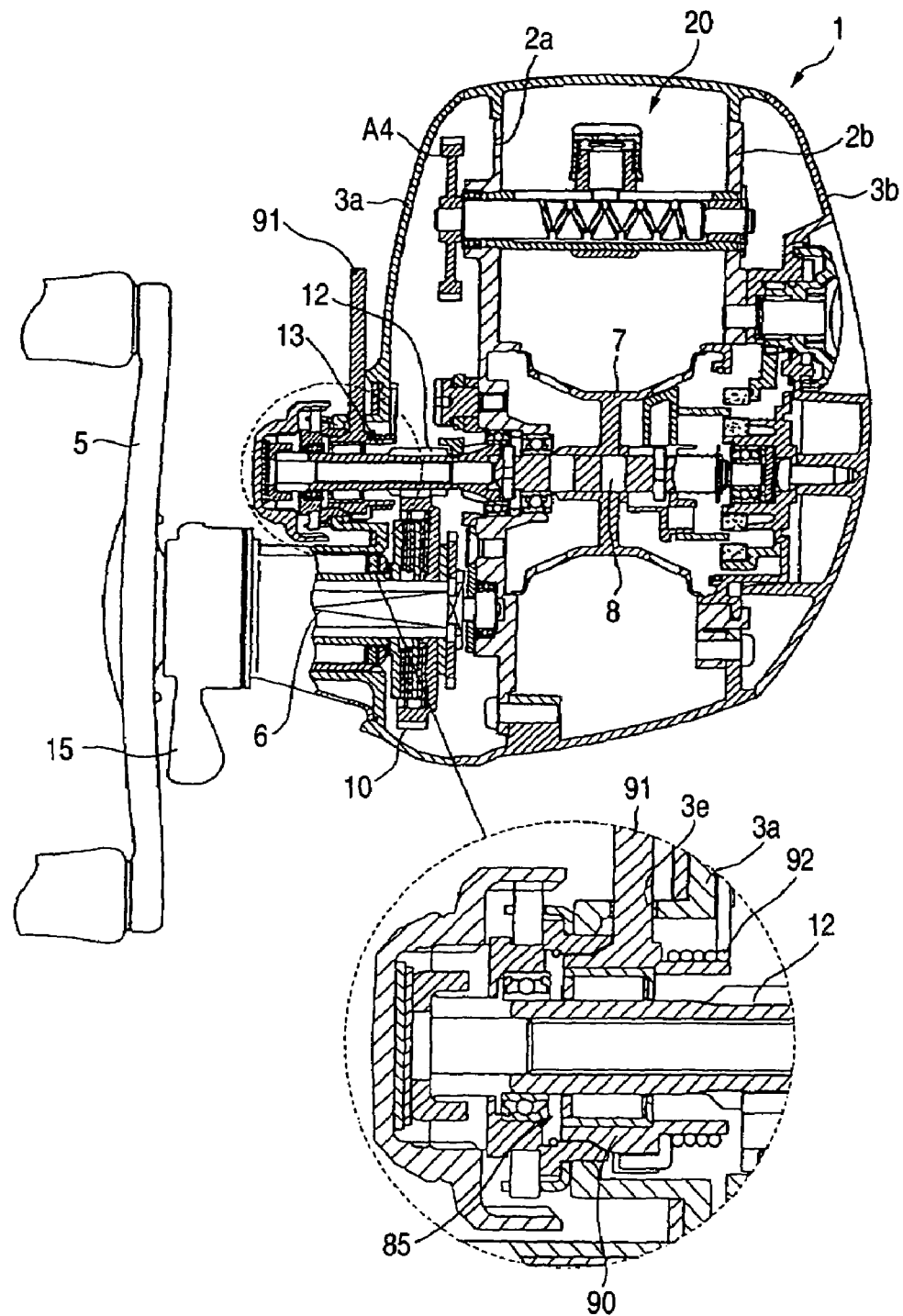
FIG. 16 is a sectional plan view of a fifth embodiment of a fishing reel according to the invention and an enlarged section view of the main portions thereof.
Figure 17:
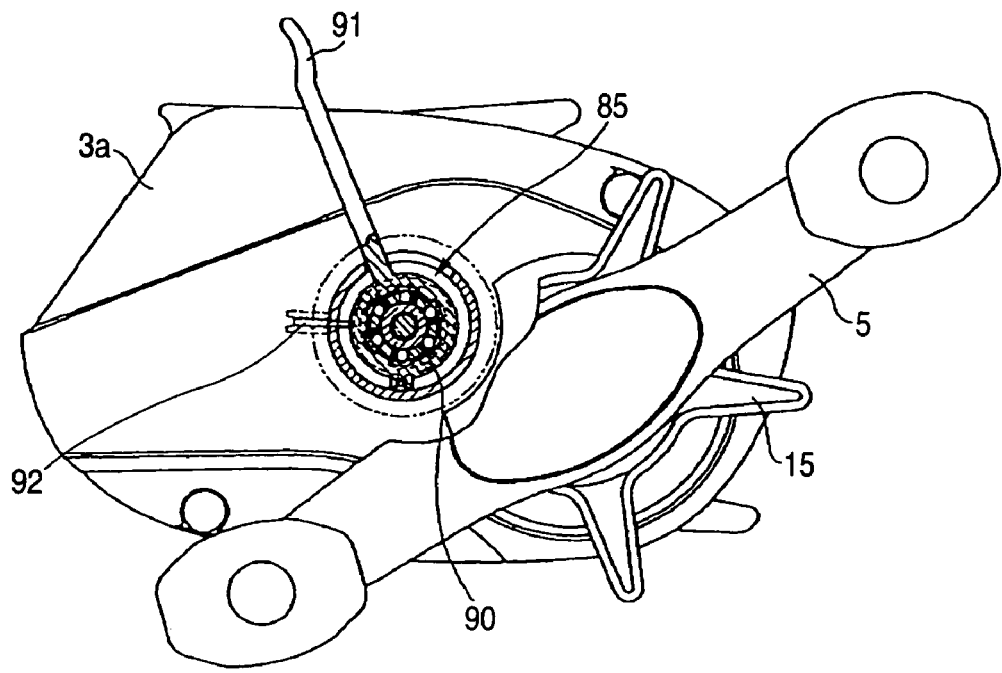
FIG. 17 a side view of the fishing reel shown in FIG. 17, when it is viewed from the counter-handle side thereof.
Figure 18:
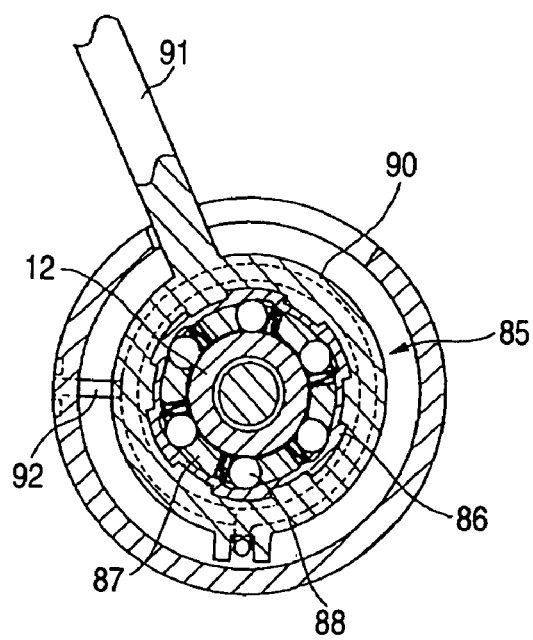
FIG. 18 is an enlarged section view of a portion of an auxiliary operation member used in the fifth embodiment.

Now, FIGS. 16 to 18 show a fifth embodiment of a fishing reel according to the invention. Specifically, FIG. 16 is a sectional plan view of a fishing reel according to the fifth embodiment of the invention and an enlarged section view of the main portions thereof, FIG. 17 is a partial section view of the present fishing reel when it is viewed from the counter-handle side thereof, and FIG. 18 is an enlarged section view of the structure of an auxiliary operation member used in the present embodiment.

In the fishing reel according to the invention, an auxiliary operation member 90 is mounted through a one-way clutch 85 on the shaft of a pinion 12 which can be engaged with a drive gear 10. This auxiliary operation member 90 includes a lever-shaped operation portion 91 which projects upwardly from the reel main body through an opening 3e formed in the upper surface of the left side plate 3a. The operation portion 91 is normally urged so as to be rotatable in the forward direction by an urging spring 92 one end of which is mounted on the left side plate 3a.

The one-way clutch 85 includes an outer race 86 to be fitted with the auxiliary operation member 90 and a plurality of rollers 88 respectively held by a retainer 87. In a state where the operation portion 91 of the auxiliary operation member 90 is urged forwardly by the urging force of the urging spring 92, even when the handle shaft 6 is driven for reeling, the rotational drive force of the handle shaft 6 is not transmitted to the auxiliary operation member 90. Further, in case where the operation portion 91 of the auxiliary operation member 90 is operated and moved (it is operated and pulled backwardly) against the urging force of the urging spring 92, the rotation movement of the operation portion 91, as it is, can be transmitted to the spool shaft 8.

In the present structure as well, there can be obtained similar operation effects to the previously described embodiments.

Sixth Embodiment

Figure 19:
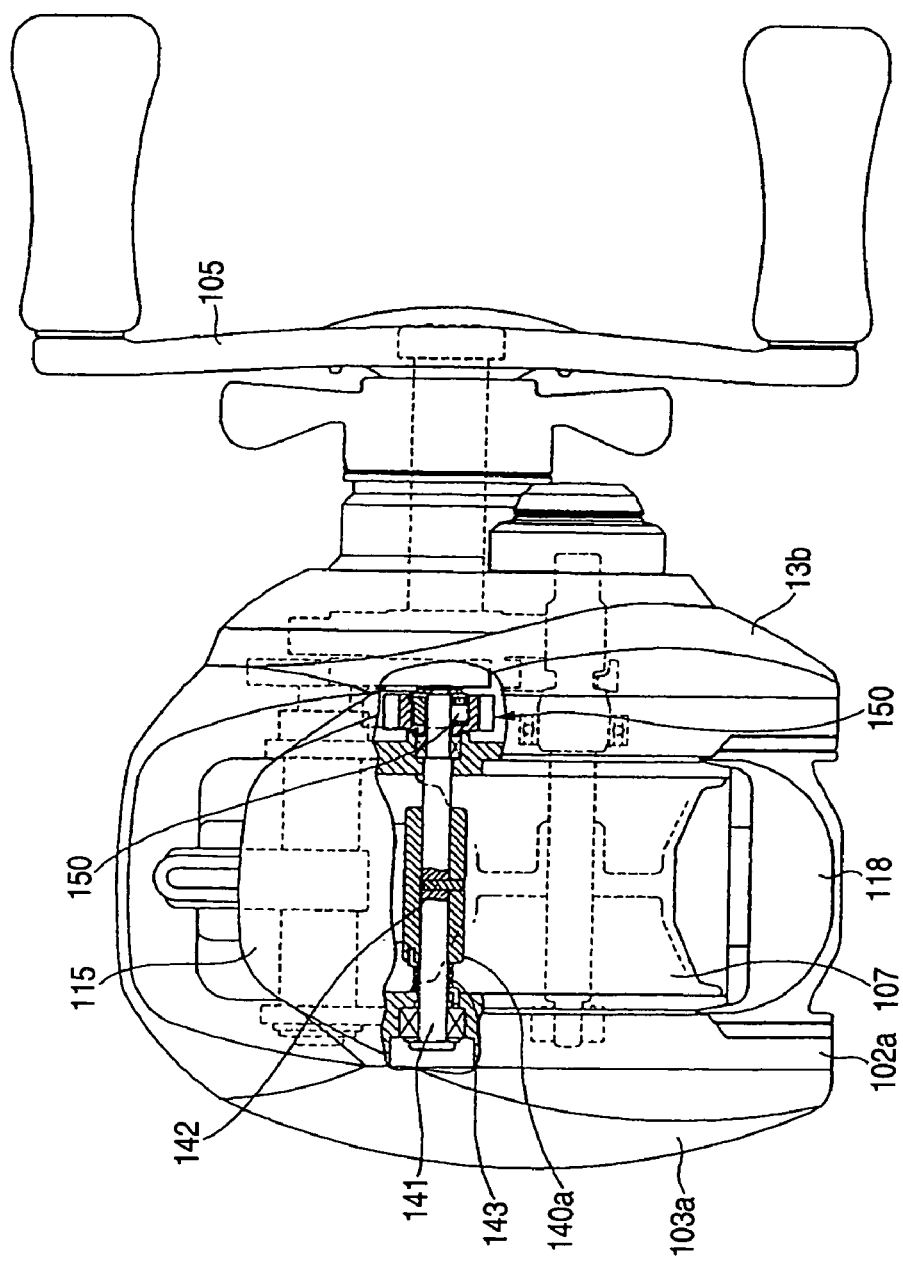
FIG. 19 is a plan view of a sixth embodiment of a fishing reel according to the invention.
Figure 20:
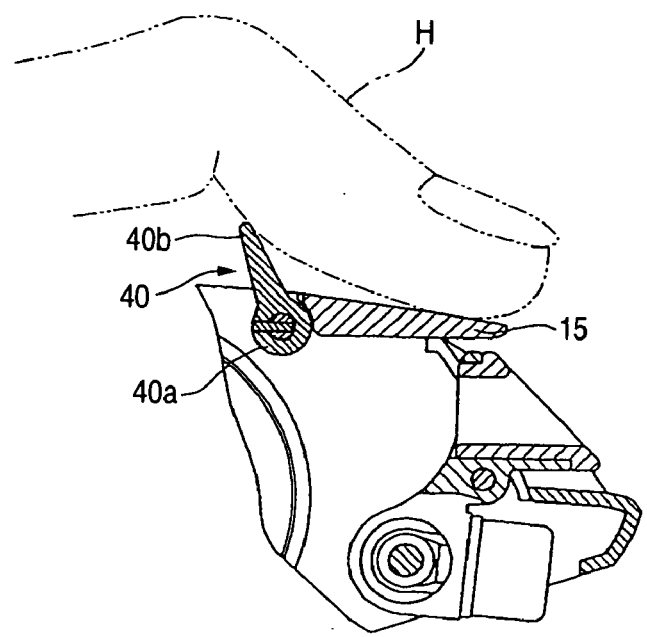
FIG. 20 is an enlarged sectional view of a portion of an auxiliary operating portion in a non-operated state.
Figure 21:
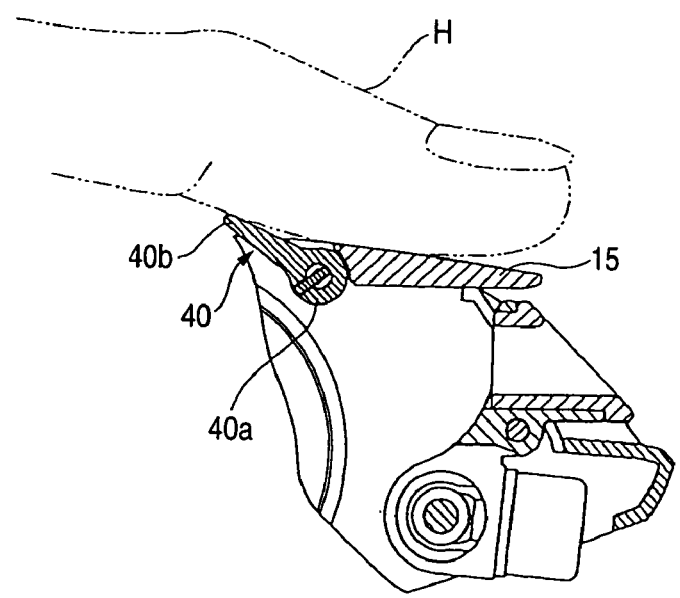
FIG. 21 is an enlarged sectional view of a portion of the auxiliary operating portion in an operated state.

FIGS. 19 to 21 show a sixth embodiment of the invention which is a modification of the third embodiment.

An auxiliary operation member 140 is rotatably supported by left and right side plates 103a and 103b such that when a thumb is put on a finger rest plate 115 the auxiliary operation member 140 can be operated by the finger. The auxiliary operation member 140 is attached to a driving axis which rotatably supported through a bearing by the frames 102a and 102b and extends along a rear edge of the finger rest plate 15. The auxiliary operation member 140 includes a base portion 140a surrounding the driving shaft 141, and an operation portion 140b which is elongated in the axial direction and projects in a radial direction. With this construction, the operation portion 140b projects upwardly from the surface of the finger rest plate 115, and the operation portion 140b can be operated by the ball of the thumb in a state that the thumb is put on the finger rest plate 115. Incidentally, as shown in figures, the rotating operation can be performed more easily if the operating portion 140b inclines backward.

The auxiliary operating member 140 is fixed to the driving shaft 141 by fitting a pin 142 in the base portion 140a. An urging spring 143 is provided between the base portion of the auxiliary operating member 140 and the left frame 2a, and the operating portion 140b is urged in a direction so as to normally rotate forwardly.

With the construction providing the auxiliary operating member 140, after the casting operation is done by changing the clutch mechanism in a spool free state, to perform the lure action, the finger H (thumb) of the hand holding a rod and the side plate opposed to the handle can operates the operating portion 40b to rotate (push-down operation) (see FIGS. 20 and 21). With this rotating operation (push-down operation), the rotating force is transmitted to the handle shaft 106 through the one-way clutch 150, and thus a state of the clutch mechanism is changed from the spool free state to a reeling state, and the delicate reeling operation on the spool 107 can be conducted continuously.

That is, the clutch lever 118 at the back of the spool is depressed by one hand (left hand) to switch off the clutch (spool free state), and after casting operation, the thumb of one hand (left hand) can depress and rotatably operate the auxiliary operating member 140 and therefore the handle is driven and rotated in a reeling direction so that the clutch mechanism is automatically changed from off state to on state (reeling state). In short, switching of clutch from on state to off state and from off state to on state can be performed by one hand (left hand) and auxiliary reeling operation can be continuously performed and reeling operation can be quickly shifted from the auxiliary reeling operation to the normal reeling operation by the handle 105 with the other hand (right hand).

Seventh Embodiment

Figure 22:
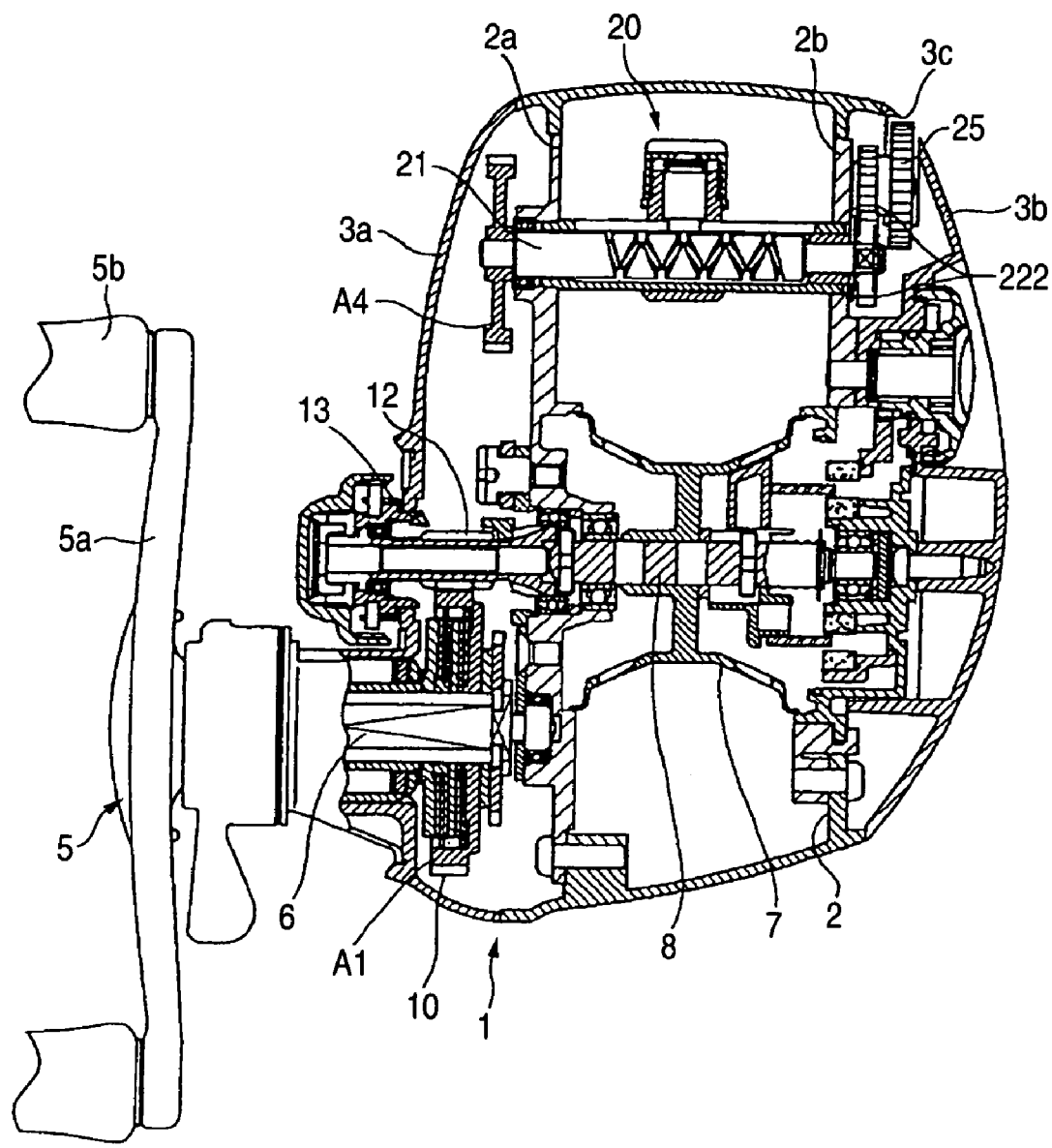
FIG. 22 is a sectional plan view of a seventh embodiment of a fishing reel according to the invention.
Figure 23:
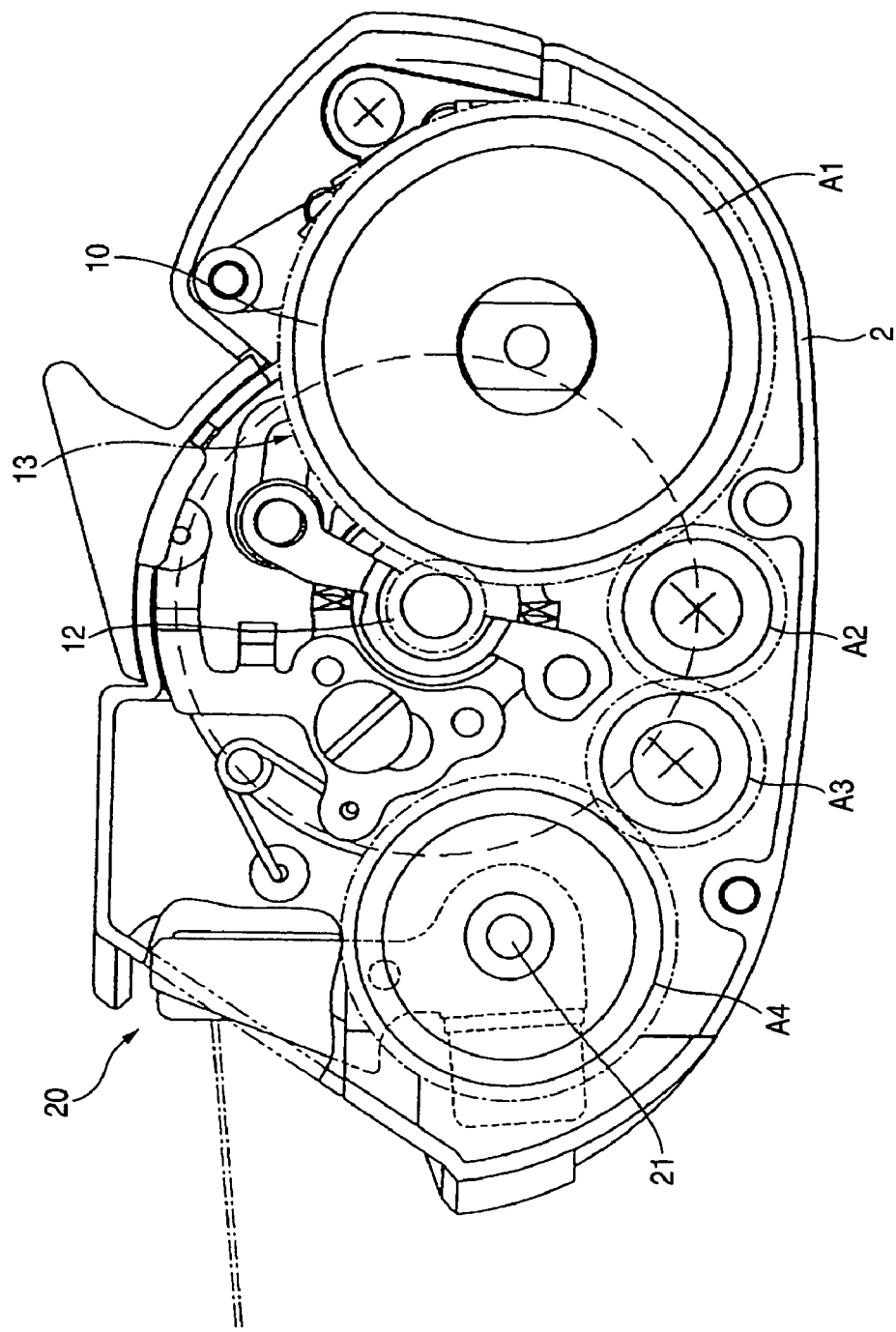
FIG. 23 is a sectional side view of the seventh embodiment of the fishing reel according to the invention.
Figure 24:
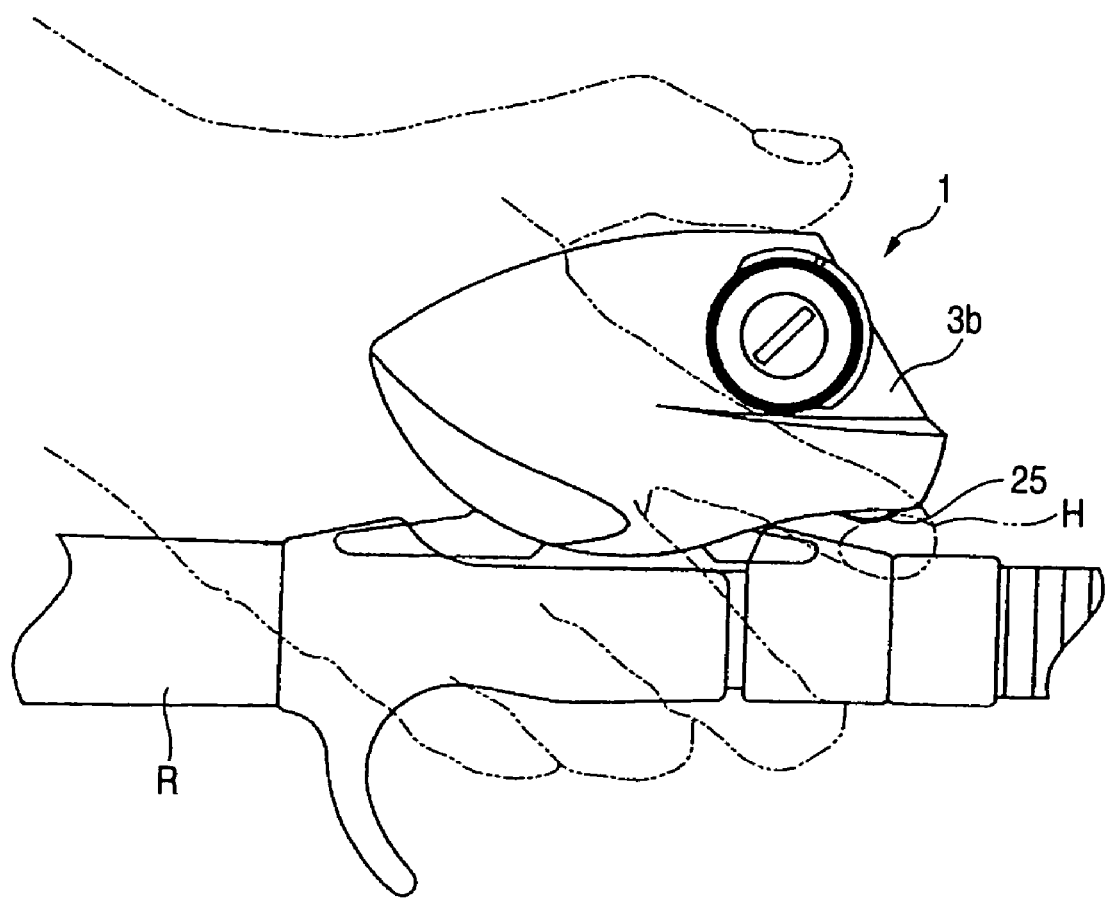
FIG. 24 is an explanatory view to show how the fishing reel shown in FIG. 22 is operated.

FIG. 22 to 24 show a seventh embodiment according to the invention, which is modification of the fourth embodiment.

As shown in FIG. 22, a dial-shaped auxiliary operating member 25 rotated in response to rotation of the driving shaft 21 through a gear 222 is rotatably supported by the right frame 2b of the side plate 3b located opposed to the handle provided side. A part of the outer circumference of the auxiliary operating member 25 is exposed exterior through an opening 3c formed through a lower front side portion of the side plate 3b located opposed to the handle provided side. The dimensions and the arrangement position of the auxiliary operating member 25 are determined so that it can be operated by a finger H (mainly forefinger) of a hand holding the side plate 3b. Incidentally, to ease the operation by the finger, the outer circumference is formed with an unevenness surface or formed of anti-sliding material.

In the present structure as well, there can be obtained similar operation effects to the previously described embodiments.

Eighth Embodiment

Figure 25:
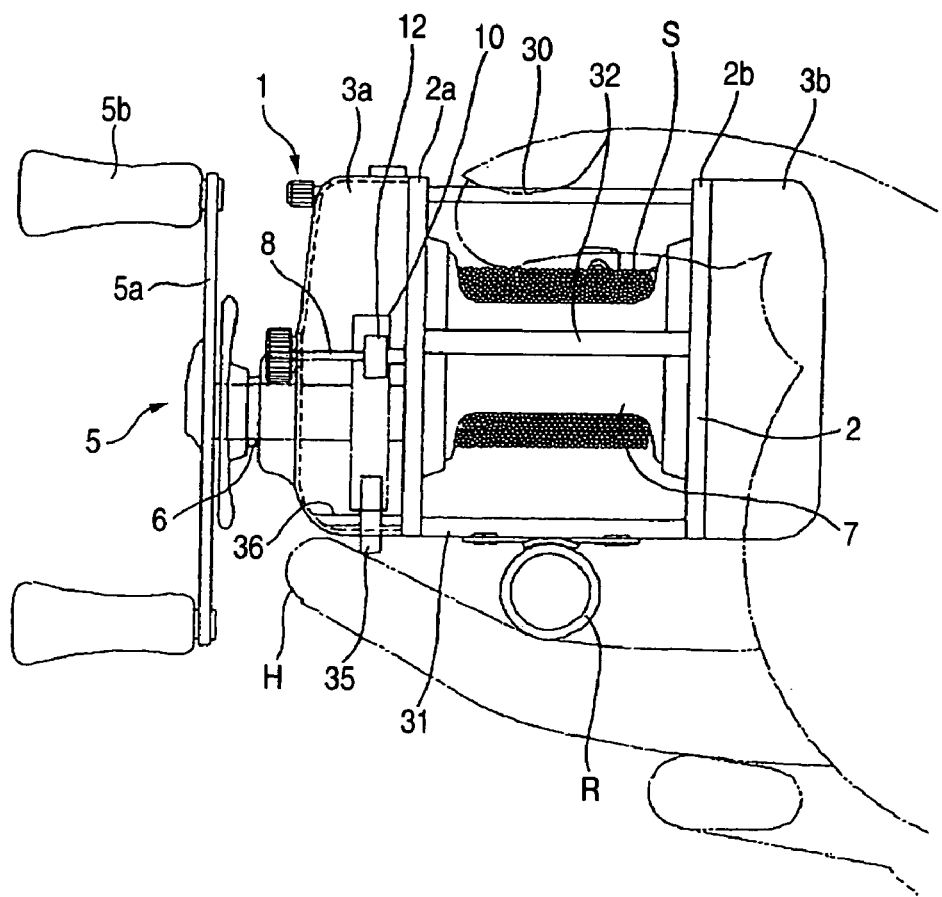
FIG. 25 is a front view of an eighth embodiment of a fishing reel according to the invention.
Figure 26:
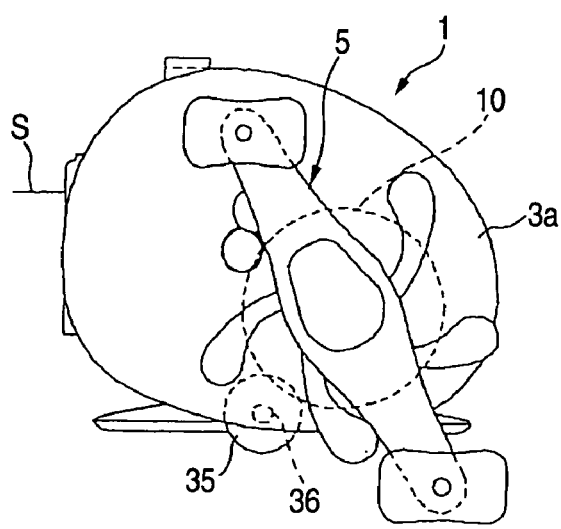
FIG. 26 is a side view of the eighth embodiment of a fishing reel according to the invention.

FIGS. 25 and 26 show an eighth embodiment according to the invention which is a modification of the seventh embodiment.

An auxiliary operating member 35 formed by a gear is rotatably supported by the left side plate 3a so as to mesh with the driving gear 10. A part of the auxiliary operating member 35 is exposed exterior from a hole formed through the lower surface of the left side plate 3a. A fingertip of the finger H (mainly middle finger or ring finger) of the hand holding the side plate 3b located opposed to the handle side can operates the auxiliary operating member 35 by scratching it.

In the present structure as well, there can be obtained similar operation effects to the previously described embodiments.

Ninth Embodiment

Figure 27:
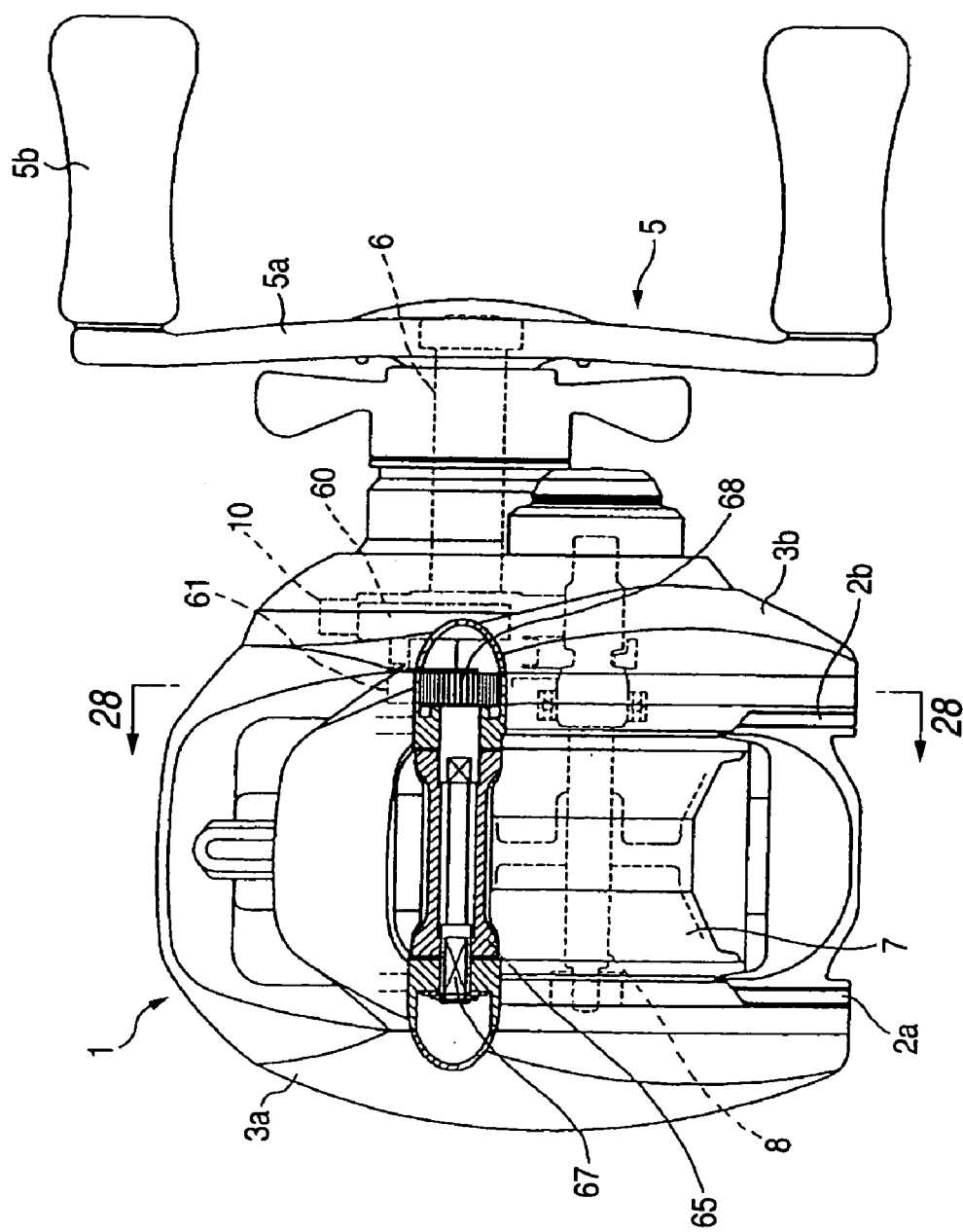
FIG. 27 is a plan view of a ninth embodiment of a fishing reel according to the invention.
Figure 28:
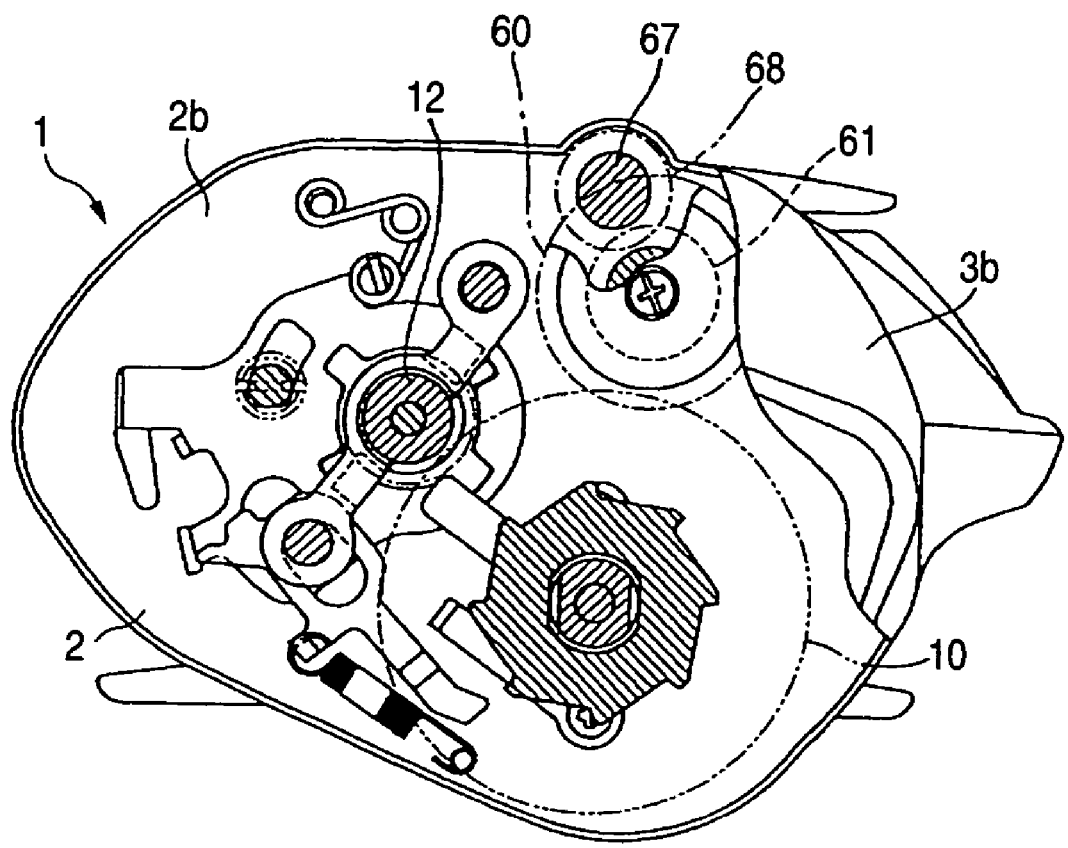
FIG. 28 is a sectional side view of the ninth embodiment of the fishing reel according to the invention.
Figure 29:
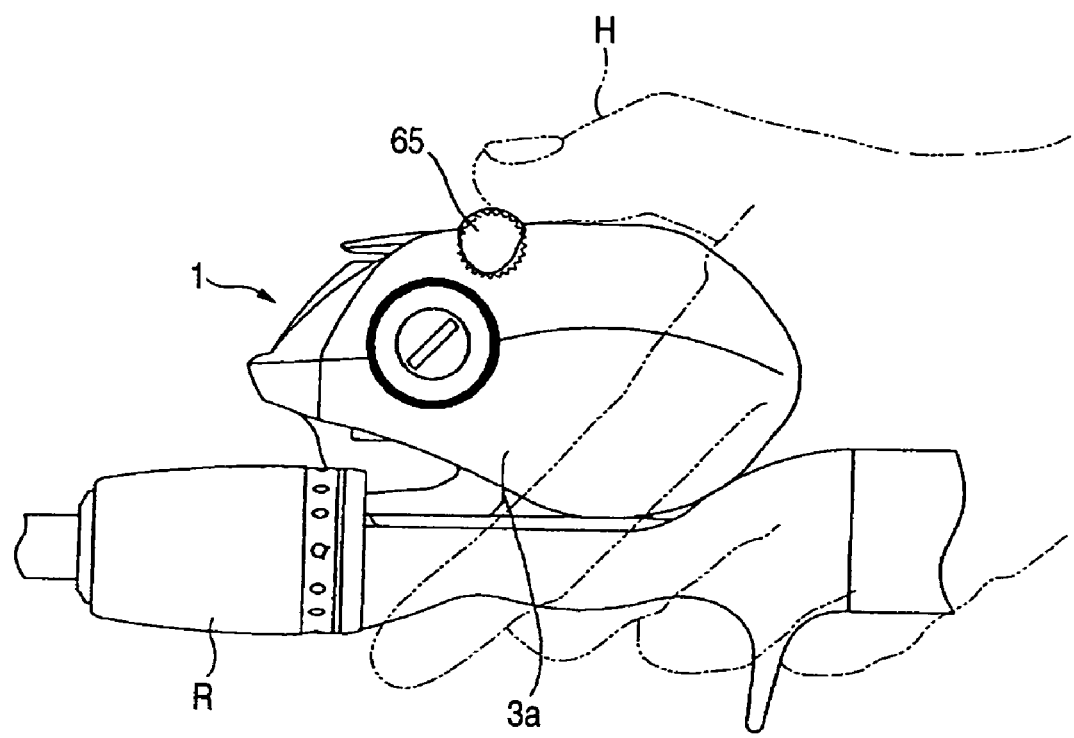
FIG. 29 is an explanatory view to show how the fishing reel shown in FIG. 27 is operated.

FIGS. 27 to 29 show a ninth embodiment according to the invention, which is a modification of the seventh embodiment.

A following gear 60 meshes with the driving gear 10 attached to the handle shaft 60. A gear 61 is disposed at the spool side of the following gear 60 so as to integrally rotate with the following gear 60. An auxiliary operating member 65 is rotatably provided between the right and left side plate 3a and 3b and above the spool 7. The auxiliary operating member 65 surrounds the rotation shaft 67 rotatably supported between the right and left frames 2a and 2b. One end of the rotating shaft 67 is projected from the right frame 2b at the handle side and a gear 68 is attached at the end portion of the rotating shaft 67, which meshes with the gear 61. The auxiliary operating member 65 can be operated to be rotated by the thumb H of the hand holding the side plate 3b located opposite to the handle side and the rod R, and the spool 7 can be rotated by the rotation operation of the auxiliary operating member 65 through the driving gear 10 to reel in the fishing line on the spool 7.

In the present structure as well, there can be obtained similar operation effects to the previously described embodiments.

While the respective embodiments of the invention have been described heretofore, the auxiliary operation member to be disposed through the above-mentioned one-way clutch, when the handle is windingly driven, can be disposed on rotary shafts (which include rotary bodies such as gears) which can be driven and rotated; and, the operation portion of the auxiliary operation member can be disposed in the proper positions of the reel main body, provided that the positions allow the operation portion to be operated by operating the fingers of the handle on the counter-handle side. Also, the shapes of the auxiliary operation member and operation portion thereof as well as methods for operating them can be changed properly. For example, the auxiliary operation member and the operation portion thereof may be formed so as to have an outer peripheral uneven portion, whereby they may be operated and rotated in a dial manner; or, rubber or a cork may be disposed on the outer periphery of a circular-shaped operation portion.

As has been described hereinbefore, according to the fishing reel of the invention, by operating and moving the auxiliary operation member using the fingers of the hand holding the fishing reel, the lure action operation can be carried out quickly and easily while maintaining the holding state of the lure stably.

What is claimed is:

1. A fishing reel comprising:
    a reel body attachable to a fishing rod;
    a spool rotatably supported by the reel body;
    a handle disposed at a side portion of the reel body for rotating the spool to winding a fishing line on the spool;
    a clutch mechanism for switching between a spool free state and a reeling state; and
    an auxiliary operating member for auxiliary winding the fishing line on the spool provided at a position in which the auxiliary operating member can be operated by a finger of an angler's hand holding the fishing rod to which the reel body is attached,
    wherein, when the auxiliary operating member is operated at a time that the clutch mechanism is in the spool free state, the operation of the auxiliary operating member causes the clutch mechanism to switch from the spool free state to the reeling state.

2. The fishing reel according to claim 1, wherein a one-way clutch is interposed between a rotating member and the auxiliary operating member, and the rotating member is rotated in response to the rotation of the handle.

3. The fishing reel according to claim 1, wherein the operation force of the auxiliary operating member is transmitted to the handle through the one-way clutch to cause the clutch mechanism to switch from the spool free state to the reeling state.

4. The fishing reel according to claim 1, wherein
    the reel body includes right and left side plates between which the spool is rotatably supported, and a finger rest plate connected between the left and right side plates to partially form an upper surface of the reel body, and
    the auxiliary operating member is operated by a thumb of the angler's hand holding the fishing rod, which is put on the finger rest plate.

5. The fishing reel according to claim 4, wherein the auxiliary operating member includes an operating portion that projects upwardly from a surface of the finger rest plate.

6. The fishing reel according to claim 5, wherein the operating portion inclines backward.

7. The fishing reel according to claim 1. wherein a rotation axis of the handle is substantially parallel to a rotation axis of the spool.

* * * * *